United States Patent
Mizukami

(10) Patent No.: US 7,548,240 B2
(45) Date of Patent: Jun. 16, 2009

(54) DRAWING APPARATUS, DRAWING PROGRAM, RECORDING MEDIUM AND DRAWING METHOD

(75) Inventor: Koji Mizukami, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 297 days.

(21) Appl. No.: 10/859,358

(22) Filed: Jun. 3, 2004

(65) Prior Publication Data
US 2004/0246253 A1 Dec. 9, 2004

(30) Foreign Application Priority Data
Jun. 4, 2003 (JP) .............................. 2003-159612
May 17, 2004 (JP) .............................. 2004-146504

(51) Int. Cl.
G06G 5/00 (2006.01)
G06T 11/00 (2006.01)

(52) U.S. Cl. ....................................... 345/467; 345/619

(58) Field of Classification Search ................. 345/443, 345/619, 441, 467
See application file for complete search history.

(56) References Cited

U.S. PATENT DOCUMENTS

| | | | | |
|---|---|---|---|---|
| 5,113,522 A * | 5/1992 | Dinwiddie et al. | ........... | 713/375 |
| 6,049,871 A * | 4/2000 | Silen et al. | ....................... | 713/2 |
| 6,272,627 B1 * | 8/2001 | Mann | ............................... | 713/2 |
| 6,373,498 B1 * | 4/2002 | Abgrall | ........................ | 345/619 |
| 6,487,656 B1 * | 11/2002 | Kim et al. | ....................... | 713/2 |
| 6,519,659 B1 * | 2/2003 | Stevens | ......................... | 710/15 |
| 6,791,572 B1 * | 9/2004 | Cloney et al. | ................ | 345/619 |
| 6,906,721 B1 * | 6/2005 | Burrell | ......................... | 345/581 |
| 6,993,645 B2 * | 1/2006 | Joseph et al. | ................... | 713/2 |
| 7,073,051 B2 * | 7/2006 | Touchet | .......................... | 713/1 |
| 2003/0084206 A1 * | 5/2003 | Floman et al. | ................. | 710/1 |

FOREIGN PATENT DOCUMENTS

| | | |
|---|---|---|
| JP | 49-053346 | 9/1972 |
| JP | 49-123738 | 3/1973 |
| JP | 60-022236 | 2/1985 |
| JP | 61-086836 | 5/1986 |
| JP | 03-122748 | 5/1991 |
| JP | 09-168070 | 6/1997 |

OTHER PUBLICATIONS

U.S. Appl. No. 10/227,308, filed Aug. 26, 2002, Kawaura.
U.S. Appl. No. 10/227,303, filed Aug. 26, 2002, Kawaura.
U.S. Appl. No. 10/227,921, filed Aug. 27, 2002, Senda.
U.S. Appl. No. 10/429,865, filed May 6, 2003, Kobayashi et al.
U.S. Appl. No. 10/723,603, filed Nov. 26, 2003, Kobayashi et al.
U.S. Appl. No. 10/859,358, filed Jun. 3, 2004, Mizukami.

* cited by examiner

*Primary Examiner*—Chante Harrison
(74) *Attorney, Agent, or Firm*—Oblon, Spivak, McClelland, Maier & Neustadt, P.C.

(57) ABSTRACT

A drawing apparatus includes a management part managing data recorded in a recording part, a first obtaining part obtaining data for drawing, which is used in common by a plurality of programs, without using the management part, when the management part is not started up or cannot be used and a drawing part performing drawing based on the data for drawing.

15 Claims, 22 Drawing Sheets

```
0000000
0111111
0100000
0100000
0111100
0100000
0100000
0100000
0100000
```

```
0000000
0001000
0001010
0111101
0010101
0010100
0100100
0101000
0101000
```

$R$

!!ERROR!!

FIG.22

MEMORY SPACE

| |
|---|
| DATA FOR DRAWING IN ENGLISH |
| DATA FOR DRAWING IN JAPANESE |
| DATA FOR DRAWING IN GERMANY |
| DATA FOR DRAWING IN FRENCH |

DRAWING APPARATUS, DRAWING PROGRAM, RECORDING MEDIUM AND DRAWING METHOD

BACKGROUND OF THE INVENTION

1. Field of the Invention

The present invention relates to a drawing apparatus, a drawing program, a recording medium and a drawing method.

2. Description of the Related Art

Recently, a so-called 'file system' is wide used as a measure to manage data stored in a storage device or such. A library or such included in a process in an apparatus employing the file system obtains data from the storage device or such by means of the file system. In a common way, such a file system is provided as one of functions of an OS (operation system).

First, a concept of a process and a library such as those are described with reference to FIG. 1. FIG. 1 illustrates the concept of the process and the library.

As shown, it is assumed that a plurality of different user processes (user processes A, B and C) are provided. In such a configuration, identical libraries (programs) are disposed for the different user processes respectively in a common virtual space. Such a library may be, for example, a library for character input/output, a library for calculation, a library for operation part, or such.

With reference to FIG. 2, one example of operation of such a library for an operation part is described next. FIG. 2 shows a flow chart illustrating operation of a library for an operation part (actually, an operation panel accompanying an image forming apparatus, or such).

For example, a program for an operation part performing drawing a message or such on a display device or such determines a type of a library function to call in Step S1. For example, when it is determined that a 'frame' is to be drawn on the display device or such (a branch (1) in Step S1), a library function for frame drawing is called, and then, Step S2 is performed. On the other hand, when it is determined that a 'character' is to be drawn (a branch (2) in Step S1), a library function for character drawing is called, and then, Step S5 is performed. On the other hand, when it is determined that a 'button' is to be drawn (a branch (3) in Step S1), a library function for button drawing is called, and then, Step S8 is performed.

In the above-mentioned processing, for example, the program for the operation part (such as an operation panel of an image forming apparatus or such, for example, as mentioned above) determines a type of a library function to call, according to a parameter or such given as an argument.

In Step S2, the library function for frame drawing selects a frame drawing file such as '/lib/opc.frame.obj', '/lib/opc.frame_bold.obj', or such (data for drawing), by means of the file system.

Then, in Step S3, the library function for frame drawing reads data for frame drawing from the thus-selected frame drawing file by means of the file system.

Then, in Step S4, the library function for frame drawing performs reading/writing of the data for frame drawing to a device driver of the operation part. Then, Step S11 is performed.

In Step S5, the library function for character drawing selects a character drawing file such as '/lib/opc.font.obj', '/lib/opc.font_japan.obj', '/lib/opc.font_korea.obj' or such (data for drawing), by means of the file system.

Then, in Step S6, the library function for character drawing reads data for character drawing from the thus-selected character drawing file by means of the file system.

Then, in Step S7, the library function for character drawing performs reading/writing of the data for character drawing to the device driver of the operation part. Then, Step S11 is performed.

In Step S8, the library function for button drawing selects a button drawing file such as '/lib/opc.button.obj', or such (data for drawing), by means of the file system.

Then, in Step S9, the library function for button drawing reads data for button drawing from the thus-selected button drawing file by means of the file system.

Then, in Step S10, the library function for button drawing performs reading/writing of the data for button drawing to the device driver of the operation part. Then, Step S11 is performed.

In Step S11, the device driver of the operation part actually performs drawing of a frame, a character or a button on the display device of the operation part according to the relevant data for drawing.

FIG. 3 illustrates the example of operation of the library described above with reference to FIG. 2 in a form of a functional block diagram.

The function block diagram shown in FIG. 3 shows a functional block configuration of an apparatus which employs the file system, such as an image forming apparatus, a common personal computer (simply referred to as a PC, hereinafter) or such.

The apparatus shown includes a user program (user process), a data space (memory space), and an OS. The OS includes the device driver and the file system.

As indicated by arrows (1) and (2) in FIG. 3, the library (library function) included in the user program accesses the data for drawing included in the data space via the file system. Further, as indicated by arrows (3) and (4), the library thus obtains the data for drawing from the data space via the file system.

Further, as indicated by an arrow (5), the library performs reading/writing of the data for drawing thus obtained from the data space to the device driver. Then, as indicated by an arrow (6), the device driver provides the data for drawing to an operation part device, and the operation part device performs drawing based on the thus-provided data for drawing (actually, for example, performs drawing or a message or such on a display device of the operation panel of the image forming apparatus, on a display device of the PC or such).

As described above with reference to FIGS. 2 and 3, the library in the process in the apparatus employing the file system obtains the data for drawing via the file system, and performs drawing based thereon. The 'data for drawing' is data, such that a message or such is drawn on a display device or such based thereon. FIGS. 17A and 17B, described later, are typical examples of the data for drawing.

With reference to FIG. 4, one example of starting up operation performed after a power supply is turned on in the image forming apparatus, the PC or such is described. FIG. 4 shows a flow chart illustrating one example of starting up operation performed after a power supply is turned on in the apparatus.

When a power supply is turned on in the image forming apparatus, the PC or such, a CPU in the apparatus starts operation in Step S20. The CPU thus starting operation starts processing according to an initialization program or such. For the purpose of simplification of description, description is made as if a program itself performs processing hereinafter.

Then, in Step S21, for example, the initialization program initializes hardware in the apparatus such as the image forming apparatus or the PC.

Then, in Step S22, for example, a diagnosis program or such included in the initialization program performs diagnosis as to whether or not initialization of the hardware has been properly completed. When the diagnosis program determines that initialization of the hardware has been properly completed (Yes in Step S22), Step S24 is performed. On the other hand, when the diagnosis program determines that initialization of the hardware has not been properly completed (No in Step S22), Step S23 is performed.

In Step S23, a drawing program included in the initialization program performs display of a diagnosis error message or such on a screen (of a display device) of the apparatus such as the image forming apparatus or the PC. Then, the initialization program and so forth finishes the current processing.

On the other hand, in Step S24, the initialization program starts up an OS starting up program, and the OS starting up program starts up the OS itself. After that, in Step S25, the OS starting up program starts up an application starting up program, and the application starting up program starts up an application itself.

Thus, the library (program) in the application thus started up enters a condition such as to be able to obtain the data for drawing from the data space or such via the file system included in the OS. However, in a case where the initialization error message or such is to be displayed as mentioned above before the OS is actually started up as in Step S23, it is not possible to actually perform drawing of such an initialization error message on the screen of the apparatus since the file system included in the OS has not been started up in Step S23 of FIG. 4.

In order to solve such a problem, a program itself which needs to perform drawing a message or such may previously have data for drawing inside thereof independently, and, with the use thereof, the program can perform drawing a message or such without using the file system.

With reference to FIG. 5, such a method of performing drawing a message or such without using the file system is described next. FIG. 5 shows a flow chart illustrating a method of performing drawing without using the file system.

For example, a drawing program included in an initialization program or such obtains data for drawing held inside thereof in Step S30.

Then, in Step S31, the drawing program performs drawing of a message or such based on the data for drawing obtained in Step S30.

Alternatively, it is also possible to display a message or such before an OS is started up in such a manner in which a display device is started up before the OS is properly started up, and data for drawing previously held inside of the display device itself is used for drawing the message or such on the display device.

SUMMARY OF THE INVENTION

However, in the above-mentioned way in which the program which needs to perform drawing of a message or such before the OS is started up properly holds previously the data for drawing independently, the amount of data which each program holds increases accordingly, and thus, a memory is consumed unnecessarily in total.

Further, since each program can hold a minimum necessary amount of data for drawing in general, it is not possible that it holds data for drawing a message or such for a plurality of different languages for example, and thus, it is not possible to provide display of a message or such in a plurality of different languages.

Furthermore, in the way in which each of a plurality of programs which need to perform drawing of a message or such before the OS is started up properly holds previously the data for drawing independently, for example, it is necessary to perform relevant modification for each of a plurality of programs one by one when the relevant data for drawing should be modified, thus to perform the modification on many respective locations, and thus, the relevant processing for achieving the modification become complicated, which may then result in modification error or such.

In the above-mentioned other way in which the data for drawing previously held in the display device is used to draw a message or such before the OS is properly started up, since such a display device is configured to be able to hold a minimum necessary size of such data for drawing in general, it may not be able to hold data for drawing in a plurality of different languages, and thus, it may not be possible to provide display of a message or such in a plurality of different languages. Further, since such a display device is requested in general to hold in itself data depending on a separate apparatus which drives the display device as little as possible, the size of data for drawing which the display device can hold in itself may be limited to a minimum necessary amount.

Furthermore, also in the above-mentioned other way in which the data for drawing previously held in the display device itself is used to draw a message or such before the OS is properly started up, it may be necessary to perform relevant modification not only on the data for drawing held in the display device itself but also, in some case, the corresponding data for drawing which is stored in a storage device provided in the separate apparatus such as a PC body, thus to perform the modification on many respective locations, and thus, the relevant processing for achieving the modification may become complicated, which may therefore result in modification error or such.

The present invention has been devised to solve the above-mentioned problems, and an object of the present invention is to provide a system in which it is possible to effectively perform drawing of a message or such based on data for drawing without unnecessarily consuming a memory capacity.

According to the present invention, a drawing apparatus including a management part managing data recorded in a recording part, includes: a first obtaining part obtaining data for drawing, which is used in common by a plurality of programs, without using the management part, when the management part is not started up or cannot be used; and a drawing part performing drawing based on the data for drawing.

In this configuration of the present invention, it is possible to easily and effectively perform drawing of a message or such based on data for drawing without unnecessarily consuming a memory capacity.

The present invention described above may also be embodied in a form of a drawing program, a recording medium or a drawing method having the same features as those of the above-mentioned drawing apparatus according to the present invention.

The above-mentioned recording part corresponds to a ROM, a non-volatile RAM, a hard disk drive and/or such. The above-mentioned management part corresponds to a file system and/or an OS such as those described above.

Other objects and further features of the present invention will become more apparent from the following detailed description when read in conjunction with the following accompanying drawings:

BRIEF DESCRIPTION OF THE DRAWINGS

FIG. 4 shows a flow chart illustrating one example of starting up processing after a power supply is turned on;

FIGS. 22 and 23 show examples of arrangements of the data for drawing concerning the multi-language message drawing function;

DETAILED DESCRIPTION OF THE PREFERRED EMBODIMENTS

With reference to figures, embodiments of the present invention will now be described.

Figure 1:
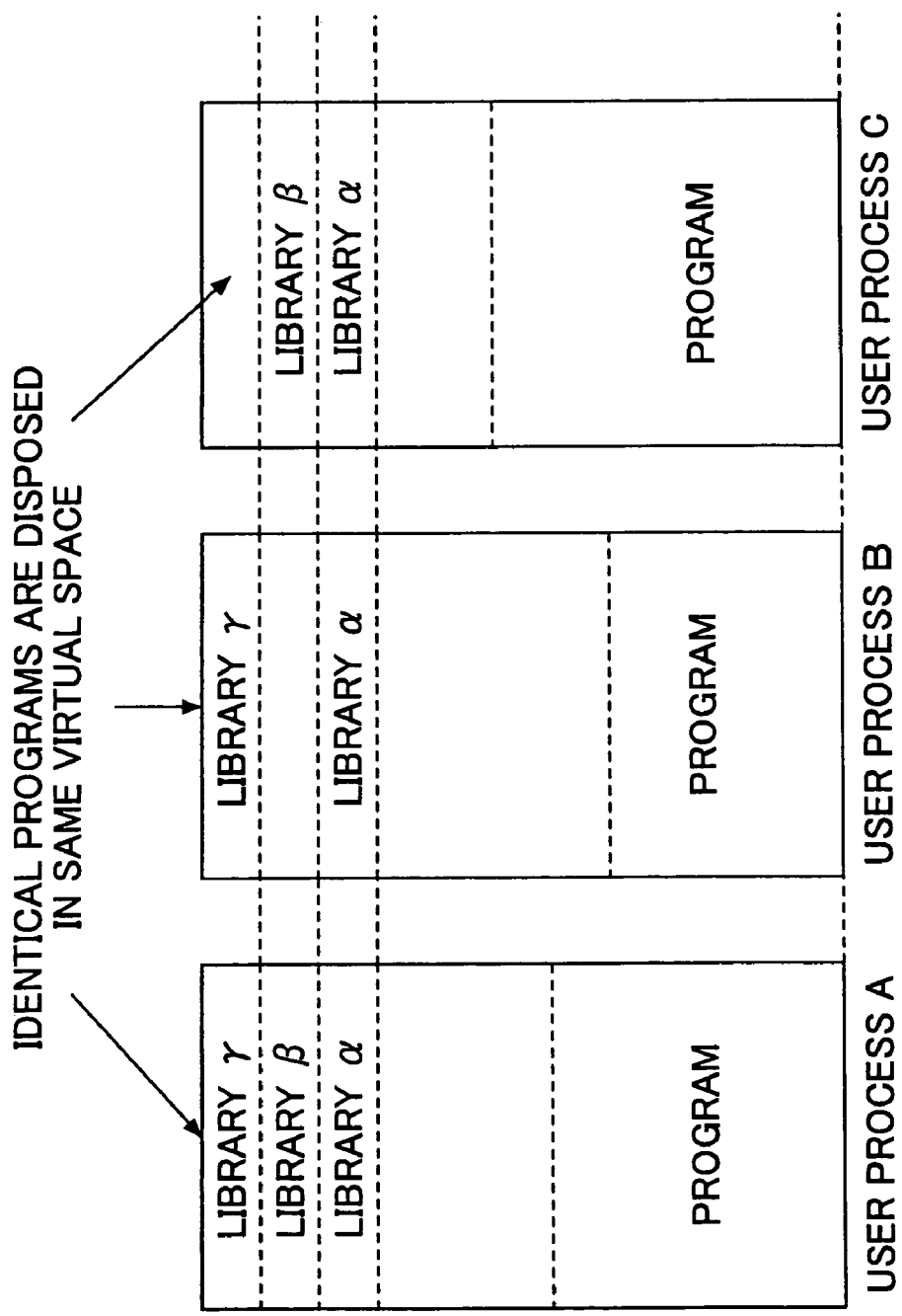
FIG. 1 illustrates a concept of processes and libraries.
Figure 2:
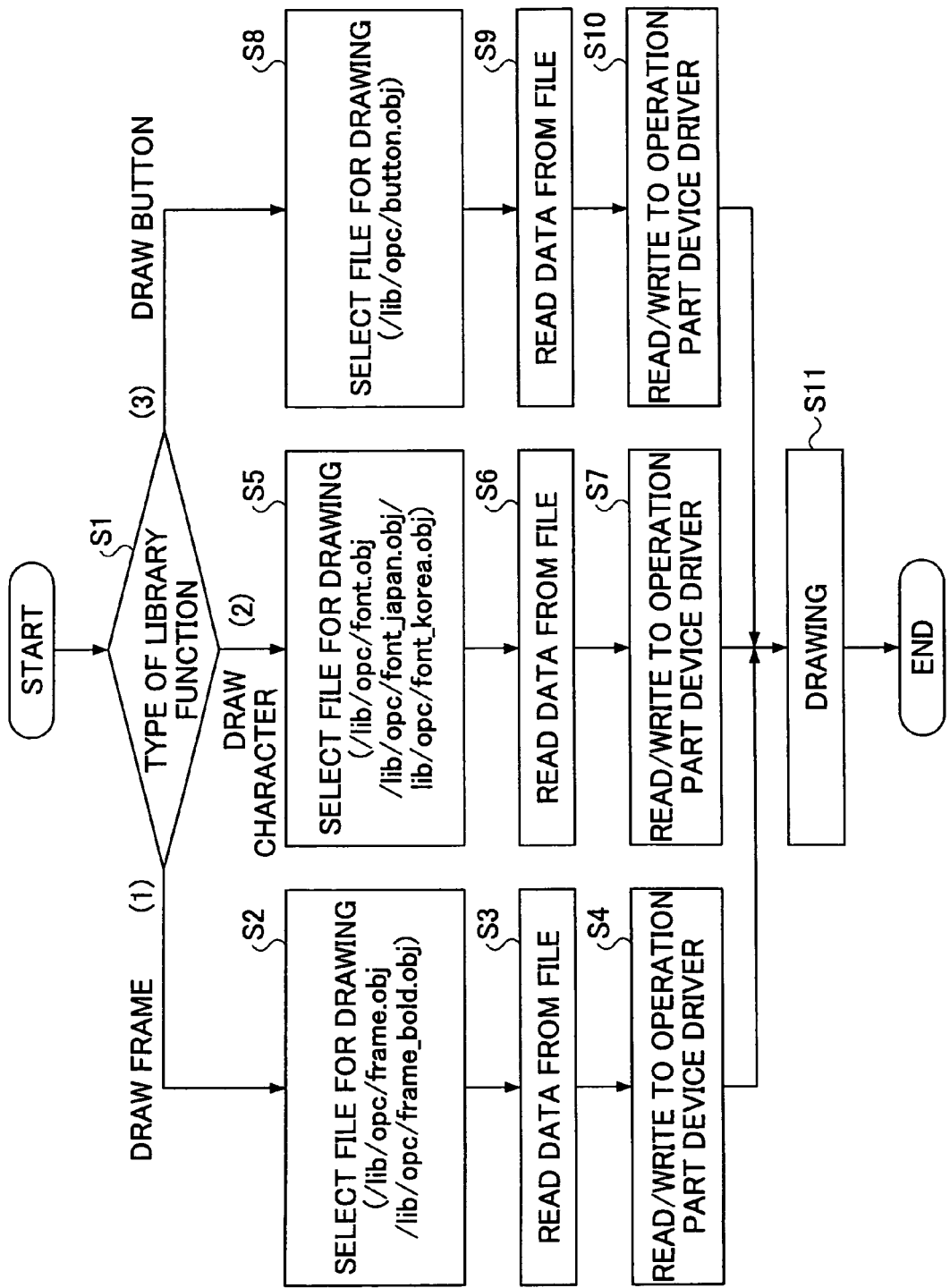
FIG. 2 shows a flow chart illustrating one example of operation of libraries for an operation part.
Figure 3:
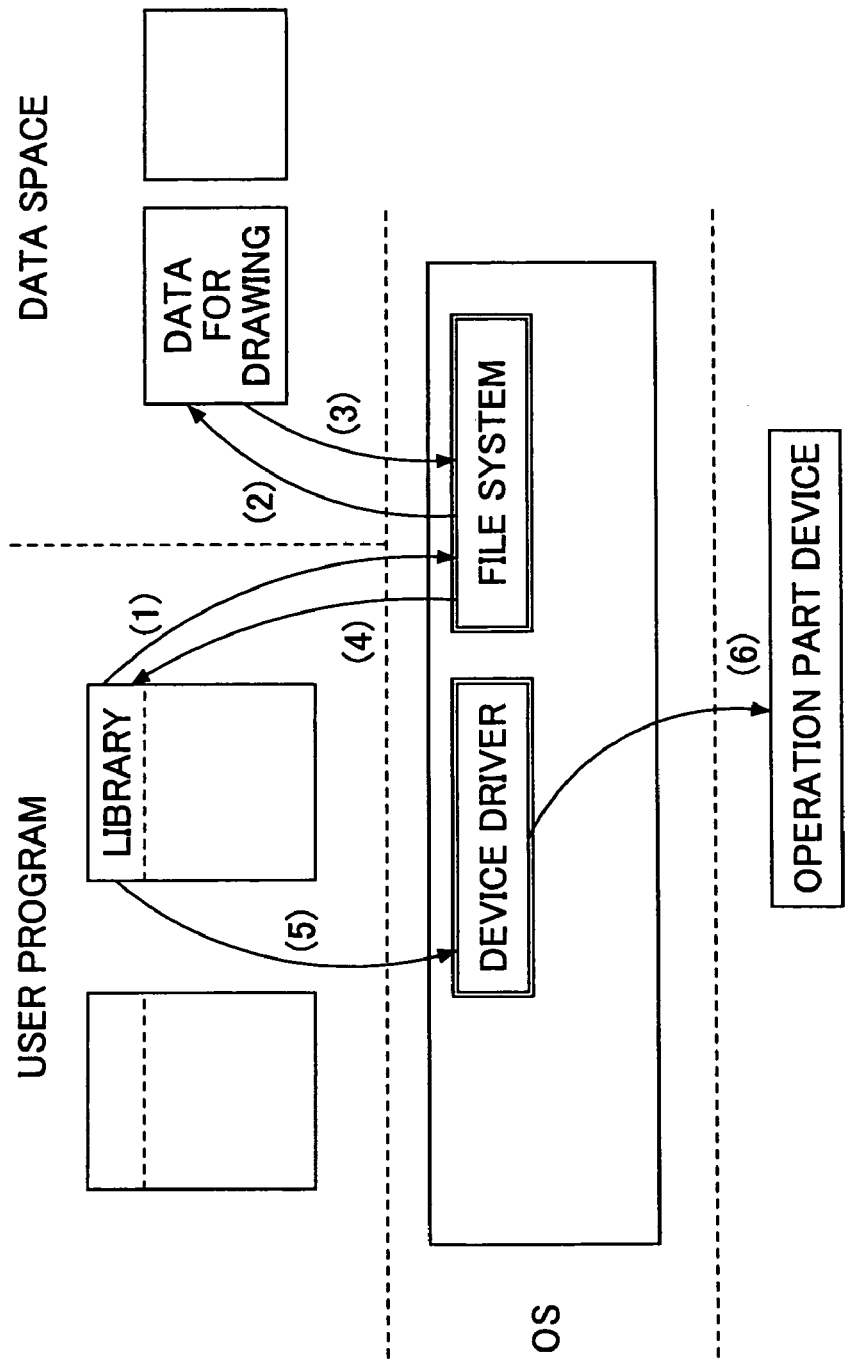
FIG. 3 shows a functional block diagram illustrating one example of operation of a library.
Figure 4:
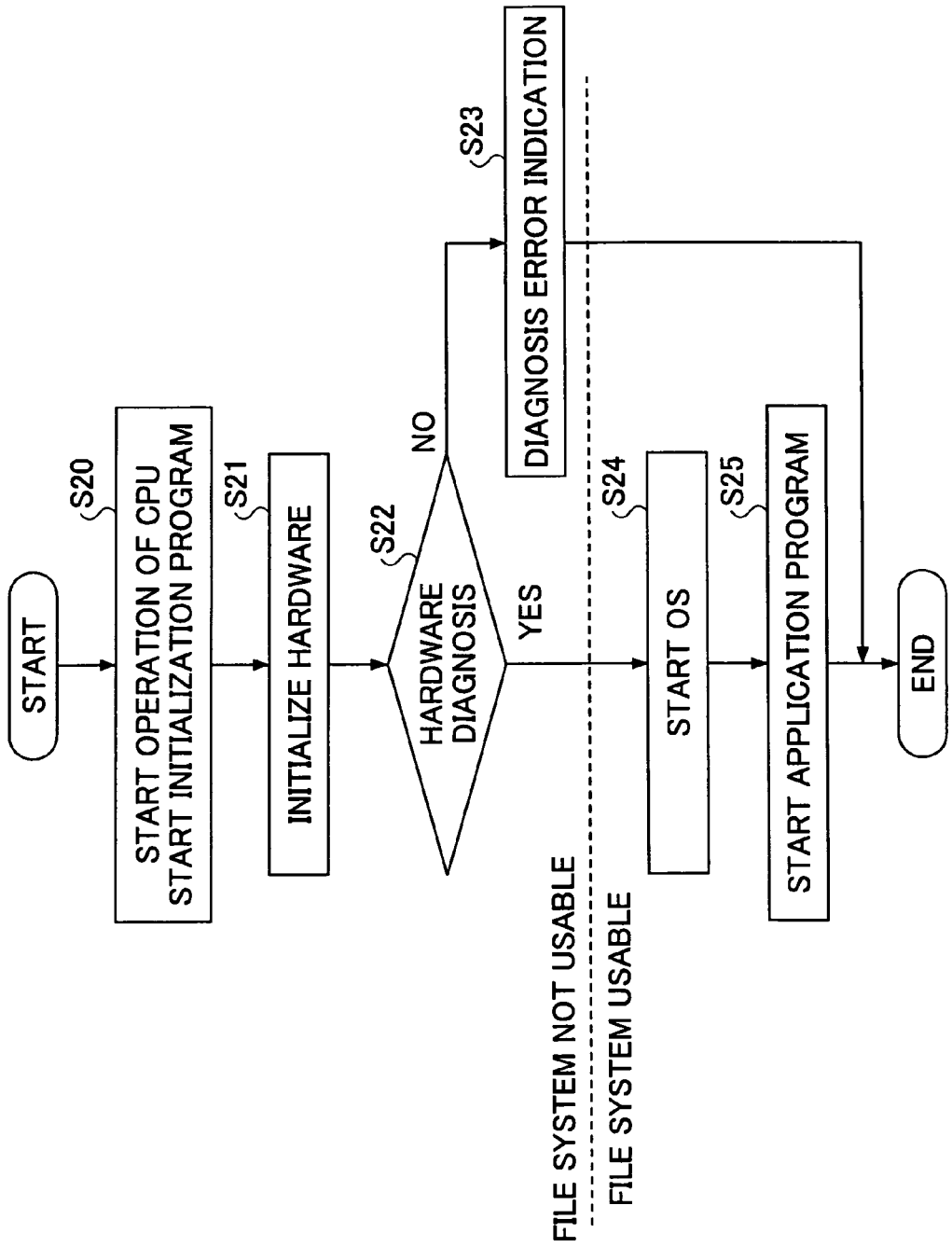
Figure 5:
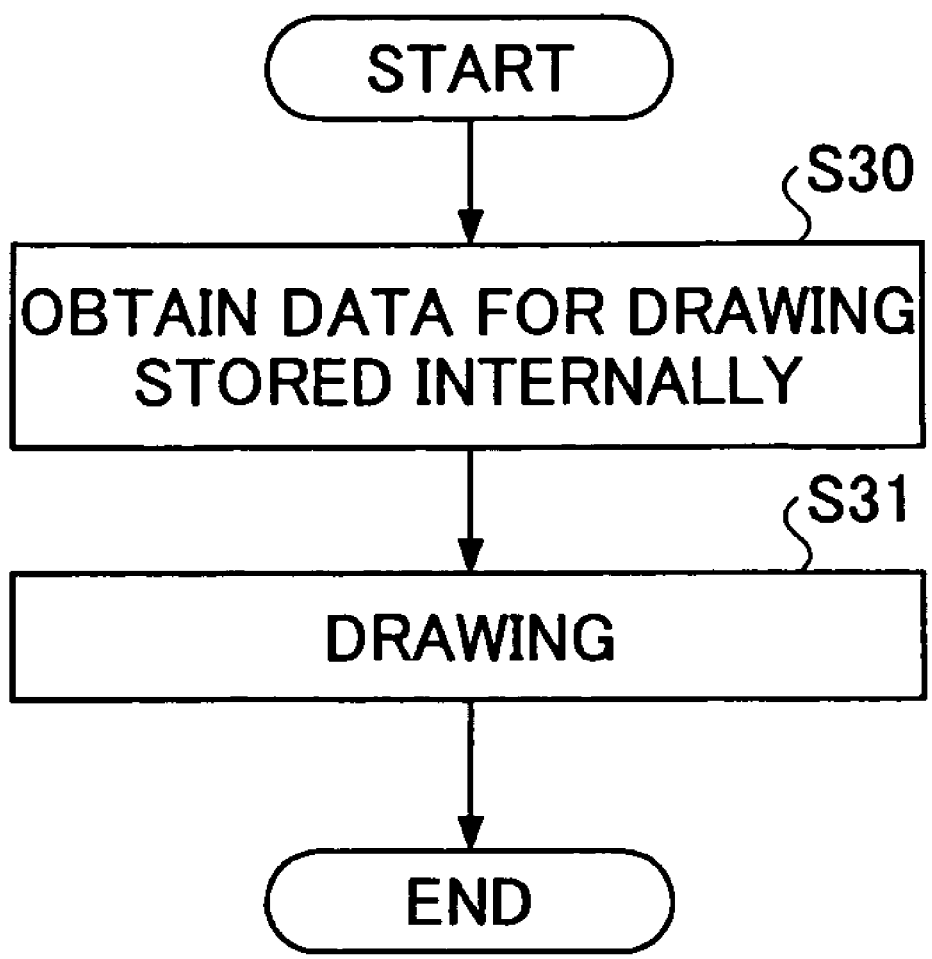
FIG. 5 shows a flow chart illustrating one example of a drawing method in the prior art in which drawing a message or such is performed without using a file system.
Figure 6:
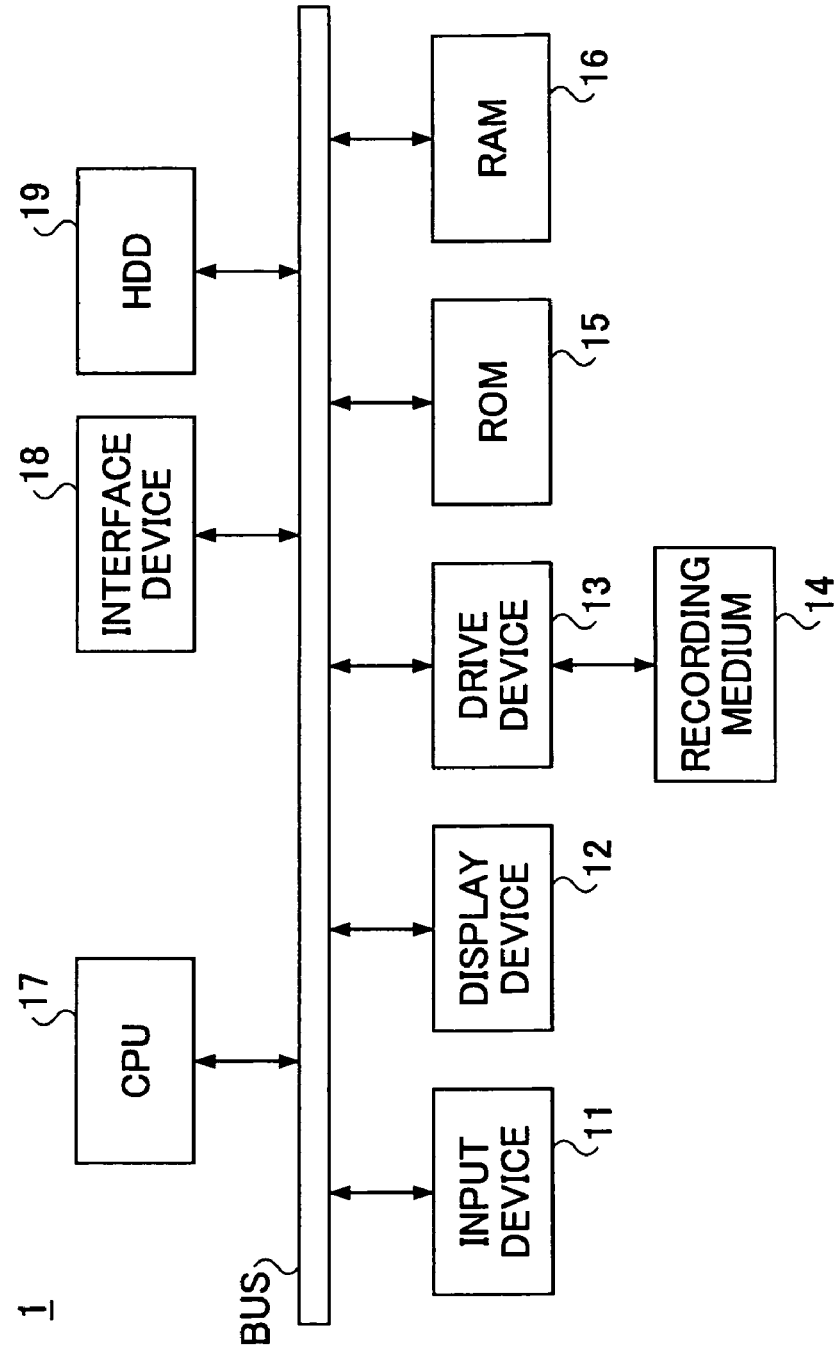
FIG. 6 shows a hardware configuration of one example of a PC in which the present invention may be applied.

Hereinafter, a first embodiment of the present invention is described assuming that the present invention is applied to a personal component PC1 as one example of a drawing apparatus according to the present invention. FIG. 6 shows a hardware configuration of the PC1.

As shown, the PC1 includes an input device 11, a display device 12, a drive device 13, a ROM (Read Only Memory) 15, a ROM (Random Access Memory) 16, a CPU (Central Processing Unit) 17, an interface device 18 and a HDD (Hard Disk Drive) 19, which are connected together via a bus as shown.

The input device 11 includes a keyboard, a mouse and so forth which a user of the PC 1 operates, and is used for the user to input various operation signals to the PC1.

The display device 12 is used for displaying various sorts of information to the user of the PC1.

The interface device 18 is an interface for connecting the PC1 to a communication network or such.

A drawing program according to the present invention, or such, described later, is provided to the PC1 by means of a carriable recording medium 14 such as a CD-ROM or such, or, is downloaded to the PC1 through the communication network. The recording medium 14 is set in the drive device 13, and, therefrom, the above-mentioned drawing program or such is installed in the ROM 15 by means of the drive device 13.

The ROM 15 stores therein the data for drawing, the above-mentioned drawing program or such. The RAM 16 is used for storing therein the drawing program or such which has been once read out from the ROM 15. The CPU 17 executes processing according to the above-mentioned drawing program or such read out and stored in the RAM 16 at a time of starting up the PC1.

The HDD 19 is used for storing therein various sorts of data (such as the data for drawing), files or such.

Figure 7:
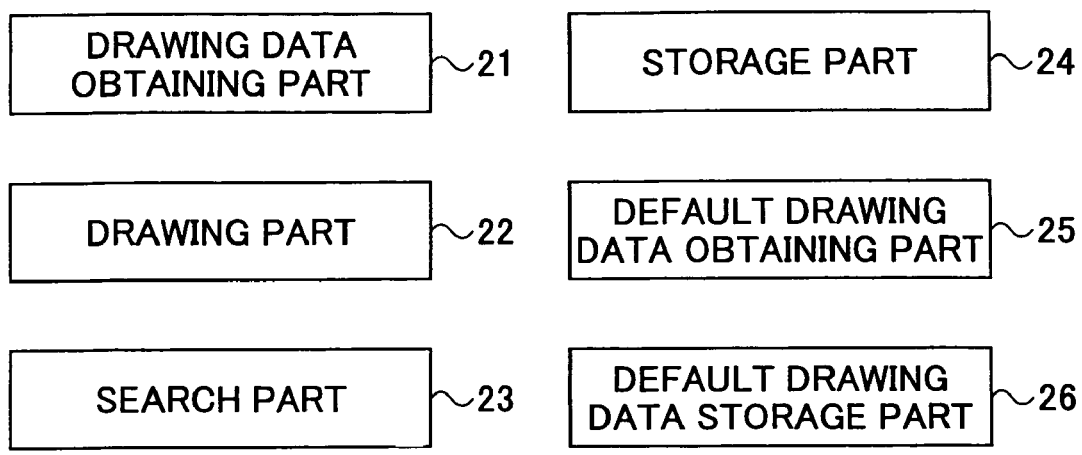
FIG. 7 shows a functional block diagram illustrating one example of a functional configuration of a drawing program according to the present invention.

With reference to FIG. 7, one example of a functional configuration of the drawing program is described next. FIG. 7 shows a functional block diagram illustrating one example of a functional configuration of the drawing program according to the present invention.

As shown in FIG. 7, the drawing program includes a drawing data obtaining part 21, a drawing part 22, a search part 23, a storage part 24, a default drawing data obtaining part 25 and a default drawing data holding part 26.

The drawing data obtaining part 21 obtains the data for drawing previously recorded in the ROM 15 or such, and/or the data for drawing stored in the storage part 24, which is described later.

The drawing part 22 generates and draws a bitmap image for example, based on the data for drawing obtained by means of the drawing data obtaining part 21, and/or default data for drawing, described later, obtained by means of the default drawing data obtaining part 25.

The search part 23 searches, for the data for drawing, a program storage area provided in the ROM 15 or such, for example, based on a predetermined character string (for example, 'FONT_FILE' or such), and/or, a predetermined bit string (for example, '01010101010' or such) used as a search key.

The storage part 24 stores the data for drawing which is a result of the search performed by the search part 23, in a predetermined storage area (for example, a non-volatile RAM 16 or such). The storage area may be provided also in the HDD 19, the carriable recording medium 14 such as an SD memory card, a separate server connected externally with the PC1 via the communication network or such, other than the non-volatile RAM 16. Further, for the safety purpose, it is also possible to store the data for drawing at a plurality of locations, or to store the same there after being divided.

Furthermore, the data drawing may be stored in a form as it is, or, may be stored in a form after being encoded/enciphered or so. For the purpose of simplification of description, description is made hereinafter assuming that the data for drawing is stored in a form as it is.

The default drawing data obtaining part 26 obtains the default data for drawing, which is previously held in the default drawing data holding part 26 of the same drawing program. The default drawing data holding part 26 holds the default data for drawing.

Figure 8:
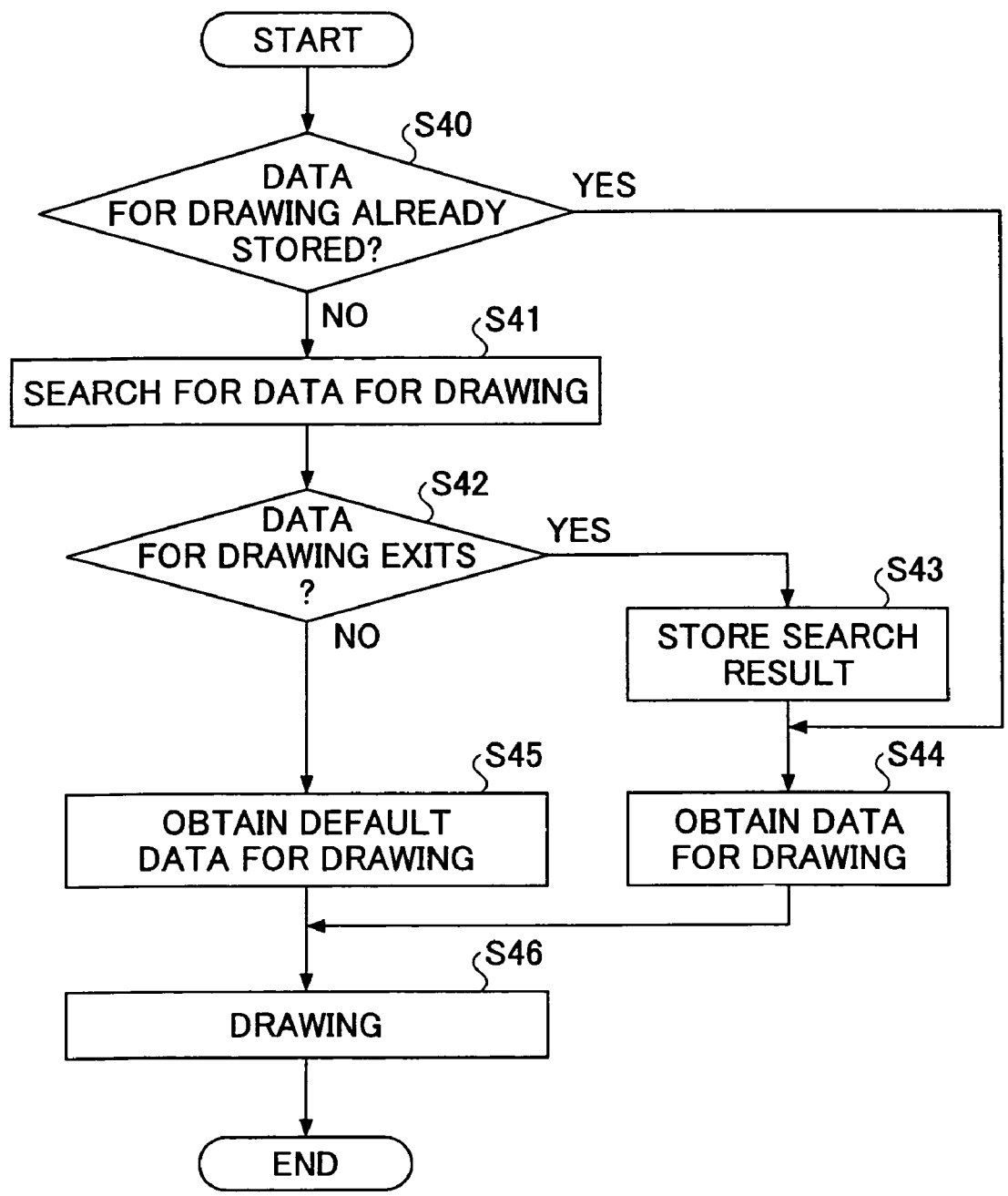
FIG. 8 shows a flow chart illustrating one example of a drawing method according to the present invention in which drawing is performed without using a file system.

With reference to FIG. 8, one example of a drawing method according to the present invention, executed in the PC1 described above, in which drawing is performed without using the file system is described next. FIG. 8 shows a flow chart illustrating one example of a drawing method according to the present invention in which drawing is performed without using the file system.

In Step S40, the above-mentioned drawing program determines whether or not the above-mentioned data for drawing is previously stored in the above-mentioned predetermined storage area. When it is determined that the data for drawing is already stored there (Yes in Step S40), Step S44 is performed. On the other hand, when it is determined that the data for drawing is not stored there yet (No in Step S40), Step S41 is performed.

The drawing program determines whether or not the data for drawing is stored in the predetermined storage area by referring to the predetermined storage area for example.

In Step S41, the search part 23 searches the above-mentioned program storage area for the data for drawing. Then, in Step S42, the search part 23 determines whether or not the data for drawing is found out in the program storage area, as a result of the search operation in Step S41. When it is determined that the data for drawing is found out (Yes in Step S42), Step S43 is performed. On the other hand, when it is determined that the data for drawing is not found out (No in Step S42), Step S45 is performed.

In Step S43, the storage part 24 stores, the data for drawing which is found out in Step S41 by means of the search part 23, in the above-mentioned predetermined storage part.

In Step S44, the drawing data obtaining part 21 obtains the data for drawing from the above-mentioned predetermined storage part.

On the other hand, in Step S45, the default data obtaining part 25 obtains the default data for drawing previously held in the default drawing data holding part 26 in the same drawing program.

In Step S46, the drawing part 22 generates a bitmap image for example, based on the data for drawing (for example, bitmap data) obtained from the above-mentioned predetermined storage area, and/or, the default data for drawing. Alternatively, it is also possible that the data for drawing is data other than the bitmap data and includes necessary instructions for the drawing part 22 to create the bitmap data.

One example of a result of drawing performed based on the data for drawing obtained from the above-mentioned predetermined storage area is described later with reference to FIG. 18, while, one example of a result of drawing performed based on the default data for drawing is described later with reference to FIG. 19.

Thus, according to the example of the present invention described above with reference to FIG. 8, the data for drawing is obtained directly from the program storage area or such without using the file system. Thereby, it is possible to easily and efficiently obtain the data for drawing and perform drawing based thereon without unnecessarily consuming a memory.

Figures 18, 19:
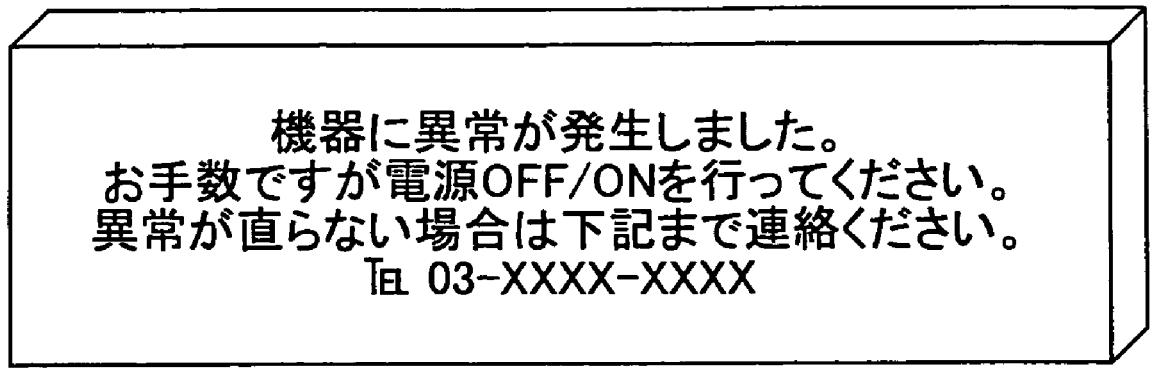
FIG. 18 illustrates one example of an error message including a detailed description in Japanese with based on the data for drawing.
FIG. 19 illustrates one example of an error message merely including a simple description based on default data for drawing.

Further, by preparing the default data for drawing which has minimum necessary information for performing drawing a message (for example, drawing an error message of a simple word 'error', as shown in FIG. 19), it is possible to effectively reduce the data amount necessary to be included in the drawing program itself. Furthermore, by utilizing the program storage area prepared in the ROM 15 or such, it is possible to store, in this program storage area, information necessary for performing drawing of a detailed message (for example, drawing an error message in Japanese or such, as that shown in FIG. 18), and thus, it is possible to provide a multi-language message drawing function, for example.

Furthermore, the data for drawing is stored in the program storage area which can be referred to in common by each of respective programs in the above-described way. Accordingly, even when modification should be made on the data for drawing, the location on which the relevant modification should be performed is only one location. Accordingly, such a modification work can be simplified, and thus, it is possible to effectively reduce a possibility of error generation.

In the example of FIG. 8 described above, the data for drawing stored in the program storage area is searched for and thus is obtained. However, instead, it is also possible to perform mounting in such a way in which the data for drawing is stored at a predetermined location (address) in the program storage area previously, and, this location (address) is hard-coded in the drawing program. By such a configuration, the drawing program obtains the data for drawing from the program storage area based on the hard-coded location (address).

Further, the above-mentioned location (address) may be described in a file or such, and the drawing program may refer to the thus-described location (address) from the file. In such as configuration, the drawing program refers to the above-mentioned file, obtains the location (address) at which the relevant data for drawing is stored, and obtains the data for drawing from the location (address).

However, for the purpose of simplification of description, description is made hereinafter assuming that the drawing program obtains the data for drawing contained in the program storage area as a result of searching it.

Hereinafter, an example is described in which a character string, a bit string or such, used as a search key when the data for drawing stored in the program storage area is searched for, is embedded in the top and/or inside of the data for drawing itself previously, with reference to FIGS. 9 through 13.

Figure 9:
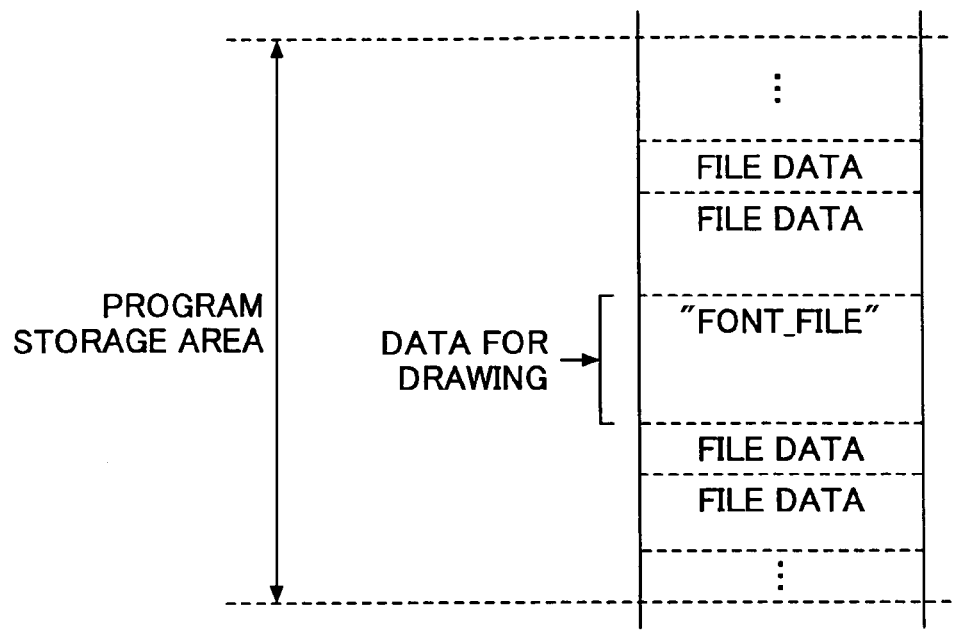
FIG. 9 illustrates one example of embedding a character string at the top of the data for drawing.

FIG. 9 illustrates one example in which a character string is embedded at the top of the data for drawing stored in the program storage area. As shown, data such as '0x46, 0x4f, 0x4e, 0x54, 0x5f, 0x46, 0x49, 0x4c, 0x45' or such, which denotes a character string of 'FONT_FILE' is previously embedded at the top of the data for drawing stored in the program storage area. Thereby, the search part 23 in the drawing program can search the program storage area for the data for drawing with the use of the character string 'FONT_FILE' as a search key.

Figure 10:
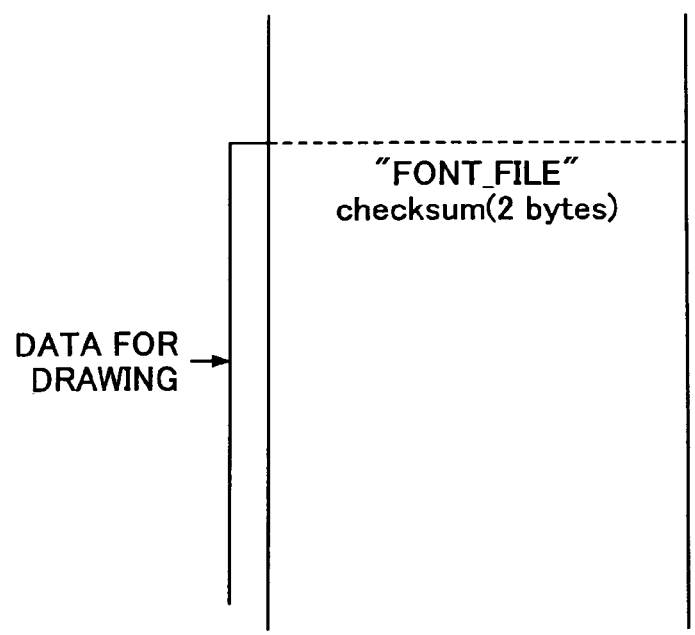
FIG. 10 illustrates one example of embedding a character string as well as a checksum at the top of the data for drawing.

Hereinafter, an example in which a checksum is embedded as well as a character string at the top of the data for drawing is described, with reference to FIG. 10. FIG. 10 illustrates an example in which a checksum is embedded as well as a character string at the top of the data for drawing.

As shown in FIG. 10, at the top of the data for drawing, a checksum of a character string 'FONT_DATA' is embedded in addition to the character string 'FONT_DATA' itself. Thereby, for example the search part 23 in the drawing program searches for the data for drawing with the use of the character string 'FONT_DATA' as a search key, and also, calculates the checksum of this character string. Then, the search part 23 compares the thus-obtained checksum with the checksum included in the data for drawing thus found out as a result of the search. Thus, it is possible to also perform error detection.

Figure 11:
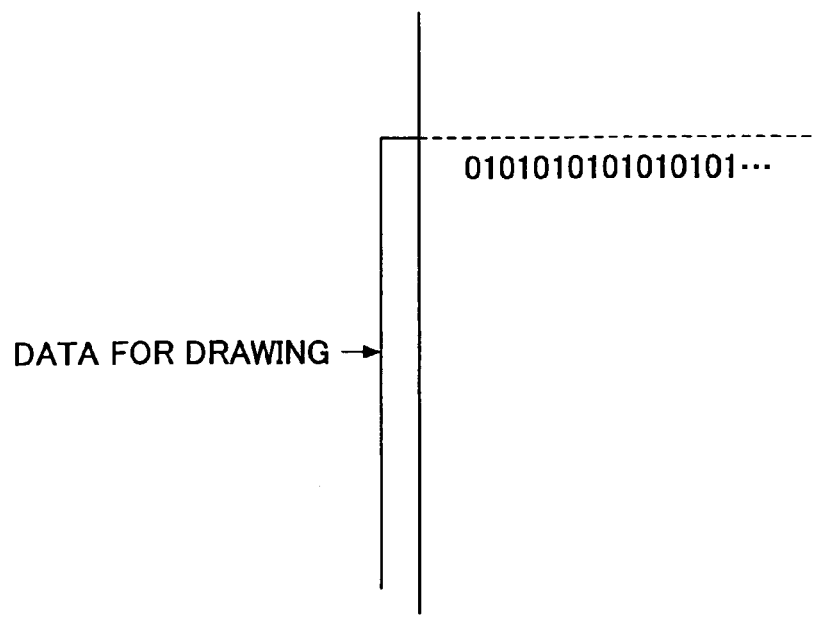
FIG. 11 illustrates one example of embedding a bit string of "01" at the top of the data for drawing.

Hereinafter, one example is described in which a predetermined bit string of "01" having a predetermined bit length (for example, the bit string including eight units in sequence each unit including a combination of "0" and "1", as shown, or such) is embedded at the top of the data for drawing, with reference to FIG. 11. FIG. 11 illustrates one example in which a predetermined bit string of "01" having a predetermined bit length is embedded at the top of the data for drawing.

As shown in FIG. 11, by embedding a predetermined bit string of "01" having a predetermined bit length at the top of the data for drawing, the search part 23 in the drawing program for example can search the program storage area for the data for drawing with the use of the predetermined bit string of "01" as a search key.

Figure 12:
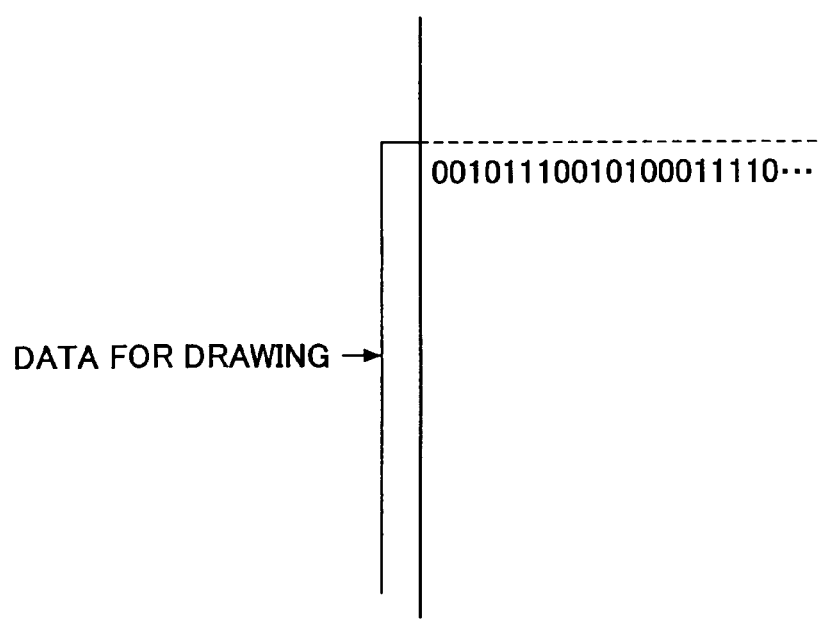
FIG. 12 illustrates one example of embedding a specific bit string at the top of the data for drawing.

Hereinafter, one example is described in which a predetermined specific bit string (for example, "00101110010100011110" as shown, or such) is embedded at the top of the data for drawing, with reference to FIG. 12. FIG. 12 illustrates one example in which a predetermined specific bit string is embedded at the top of the data for drawing.

As shown in FIG. 12, by embedding a predetermined specific bit string at the top of the data for drawing, the search part 23 in the drawing program for example can search the program storage area for the data for drawing with the use of the predetermined specific bit string as a search key.

Figure 13:
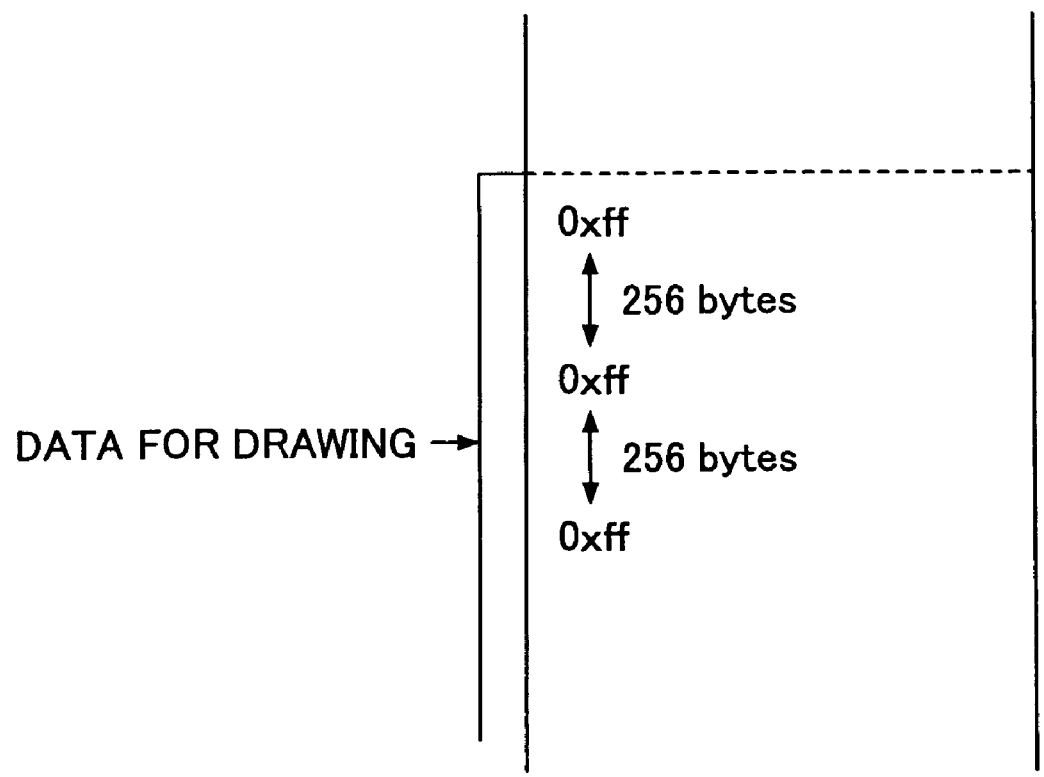
FIG. 13 illustrates one example of embedding specific bit strings at predetermined intervals at the top of the data for drawing.

Hereinafter, one example is described in which a predetermined specific bit string (for example, "0xff" as shown, or such) is embedded at each predetermined interval in the data for drawing, with reference to FIG. 13. FIG. 13 illustrates one example in which a predetermined specific bit string is embedded at each predetermined interval in the data for drawing.

As shown in FIG. 13, by embedding a predetermined specific bit string at each predetermined interval (each 256 bytes in this example) in the data for drawing, the search part 23 in the drawing program for example can search the program storage area for the data for drawing with the use of the predetermined specific bit string embedded at each predetermined interval as a search key.

Figure 14:
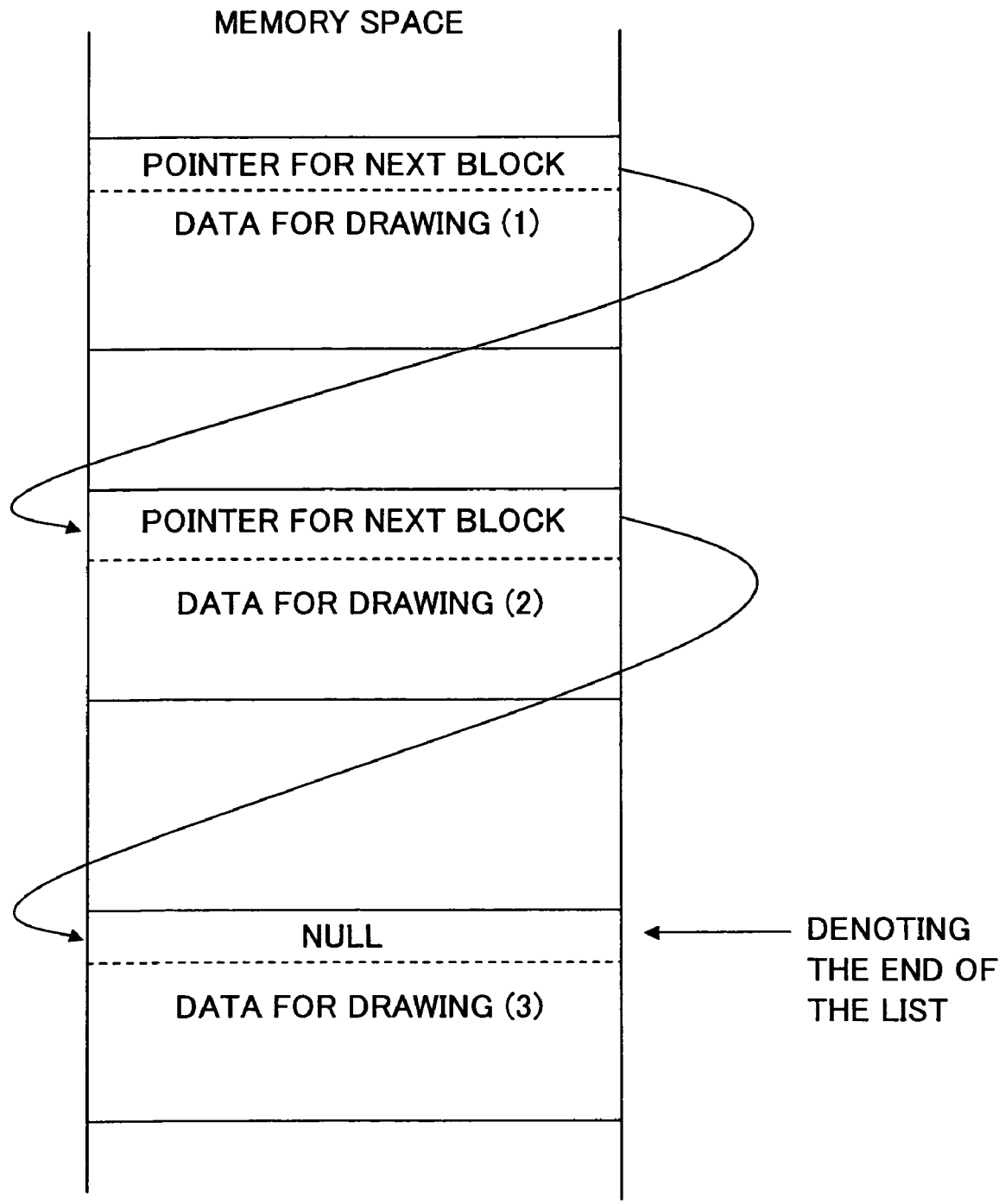
FIGS. 14 and 15 illustrate examples of allocating the data for drawing in a memory space with the use of a list configuration.

Hereinafter, one example is described in which the data for drawing is allocated in a memory space such as the program storage area with the use of a list structure, with reference to FIG. 14. FIG. 14 illustrates one example in which the data for drawing is allocated in the memory space such as the program storage area with the use of a list structure.

The data for drawing shown in FIG. 14 is allocated in each block defined in the memory space, and as well as a pointer indicating the next block. In this configuration, according to the pointers, the respective blocks can be reached in sequence, and the data for drawing (1), the data for drawing (2) and the data for drawing (3) can be read out from the respective blocks thus reached with the use of the pointers.

Figure 15:
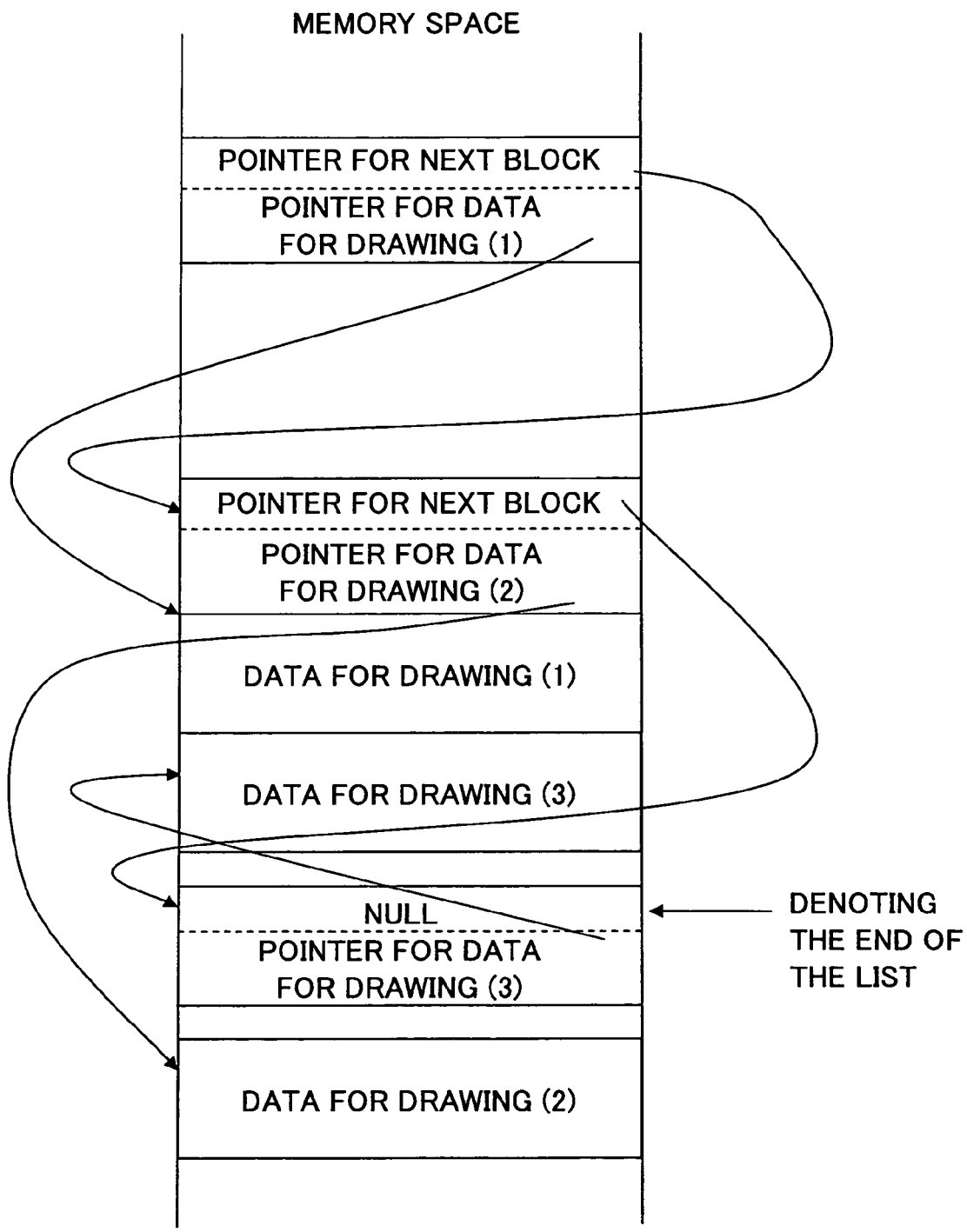

Hereinafter, another example is described in which the data for drawing is allocated in a memory space such as the program storage area with the use of another list structure, with reference to FIG. 15. FIG. 15 illustrates another example in which the data for drawing is allocated in the memory space such as the program storage area with the use of another list structure.

In the example of FIG. 15, different from the example shown in FIG. 14, in addition to the pointer for the next block as in the example of FIG. 14, a pointer for the respective data for drawing is provided as shown. The data for drawing is allocated at a target location of the respective pointer for the data for drawing in the memory space, as shown. In this configuration, according to the pointers for the block, the respective blocks can be reached in sequence, and the pointer for the data for drawing (1), the pointer for the data for drawing (2) and the pointer for the data for drawing (3) can be read out from the respective blocks thus reached with the use of the pointers. Then, the data for drawing (1), the data for drawing (2) and the data for drawing (3) can be read out according to the respective pointers for the data for drawing thus read out from the respective blocks.

Figure 16:
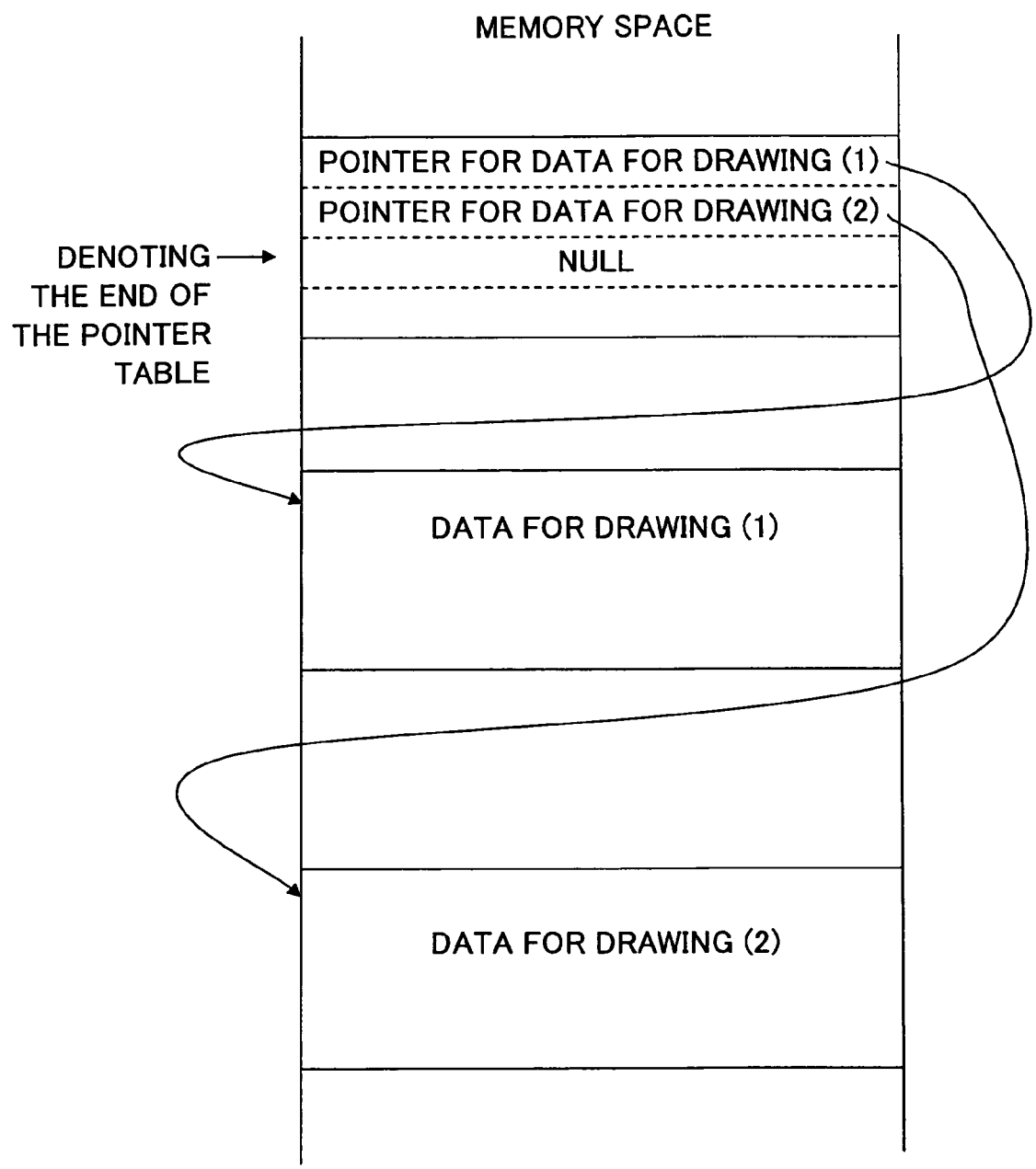
FIG. 16 illustrates an example of allocating the data for drawing in a memory space with the use of a pointer table configuration.

Hereinafter, another example is described in which the data for drawing is allocated in a memory space such as the program storage area with the use of a pointer table structure, with reference to FIG. 16. FIG. 16 illustrates another example in which the data for drawing is allocated in a memory space such as the program storage area with the use of a pointer table structure.

In the example shown in FIG. 16, a pointer table is provided in the memory space, and the data for drawing is allocated at a location in the memory space, which location is indicated by the relevant pointer stored in the pointer table.

Figures 17A, 17B, 17C, 17D:
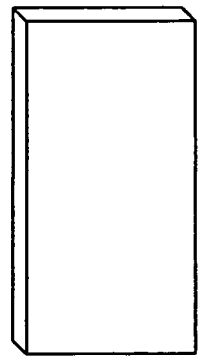
FIGS. 17A through 17D illustrate examples of data for drawing and examples of an image/character drawn based thereon.

Examples of bitmap data used by the drawing part 22 as the data for drawing are described next with reference to FIGS. 17A through 17D. FIGS. 17A and 17B illustrate examples of bitmap data which is typical examples of the data for drawing used by the drawing part 22 for drawing relevant characters based thereon as described above.

FIG. 17A shows bitmap data for an alphabet 'F', while FIG. 17B shows bitmap data for a Japanese character 'か'. FIG. 17C shows a stereoscopic frame, while FIG. 17D shows a capital alphabetical letter 'R' in a Gothic font in an italic type. The frame and the letter 'R' shown in FIGS. 17C and 17D are those drawn by the drawing part 22 based on the relevant data for drawing.

The data for drawing handled by the respective embodiments of the present invention is used for drawing a frame such as that shown in FIG. 17C, a letter (character) such as that shown in FIG. 17D or such. In order to actually realize an image of a frame, letter or such on a display device, for example, bitmap data such as that shown in FIG. 17A or 17B may be used as the data for drawing. For example, the respective locations of "1" in the bitmap data shown in FIG. 17A draw the letter 'F' while the respective locations of "1" in the bitmap data shown in FIG. 17B draw the letter 'か', as can been seen from the figures With reference to FIG. 18, one example of an error message including a Japanese detailed description which is drawn based on the data for drawing in the first embodiment according to the present invention is descried next. FIG. 18 shows one example of an error message including a Japanese detailed description which is drawn based on the data for drawing in the first embodiment according to the present invention. The contents of the description of the detailed error message shown in FIG. 18 in Japanese are as follows: 'ERROR OCCURS IN EQUIPMENT. PLEASE BE SO GOOD AS TO TURN OFF POWER SUPPLY.

IF TROUBLE STILL EXISTS, PLEASE GIVE TELEPHONE CALL TO TEL: 03-XXXX-XXXX'.

As described above, the data for drawing is stored in the program storage area which is usable in common by respective programs. In comparison to a case where the default data for drawing which each program itself holds inside thereof is used, it is possible to increase the data amount of the data for drawing stored in the program storage area, so as to achieve a message having sufficient contents such as that shown in FIG. 18. In fact, as shown in the example of FIG. 18, the drawing part 22 in the drawing program may draw a detailed error message in Japanese together with a stereoscopic frame, based on the relevant data for drawing.

Further, by previously storing data for drawing for a message in another language such as Korean, Russian or such in the program storage area as needed, the drawing part 22 in the drawing program can perform drawing a relevant message also in Korean, Russian or such accordingly.

With reference to FIG. 19, an example of a simple error message drawn based on the default data for drawing is described next. FIG. 19 illustrates an example of a simple error message drawn based on the default data for drawing.

As described above, the default data for drawing held by each program itself in the inside thereof as mentioned above is in general required to be reduced in data size in comparison to the above-mentioned case of the ordinary data for drawing stored in the program storage area. Accordingly, in fact, as shown in the example of FIG. 19, the drawing part 22 in the drawing program can draw merely a simple minimum necessary error message in English without any frame based on the relevant default data for drawing.

A second embodiment of the present invention will now be described.

The description of the second embodiment is made in a manner in which only part different from the above-described first embodiment of the present invention is described, and duplicated description is omitted. Especially, processing concerning a multi-language drawing function according to the present invention is described for the second embodiment.

Figure 20:
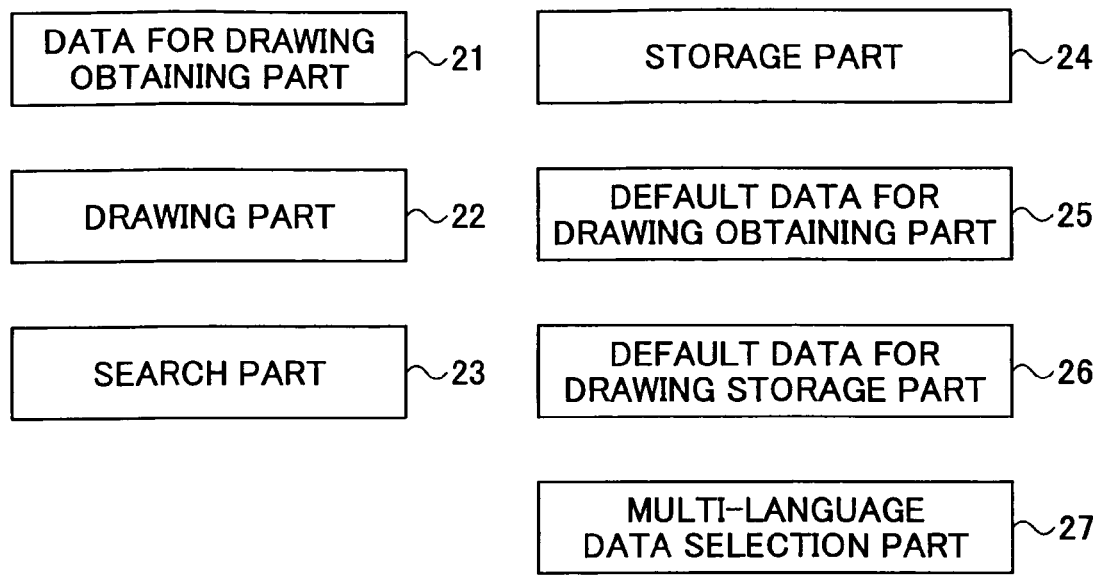
FIG. 20 shows a functional block diagram illustrating another example of a functional configuration of a drawing program according to the present invention.

FIG. 20 shows another example of a functional block diagram of the drawing program according to the second embodiment of the present invention.

As shown in FIG. 20, the drawing program includes a drawing data obtaining part 21, a drawing part 22, a search part 23, a storage part 24, a default drawing data obtaining part 25, a default drawing data holding part 26 and a multi-language data selection part 27.

The multi-language data selection part 27 reads a given country identification code, calculates a location of the relevant data for drawing, and selects the data for drawing in the relevant language. It is also possible that the multi-language data selection part is included in the search part 23 as in the first embodiment described above.

Figure 21:
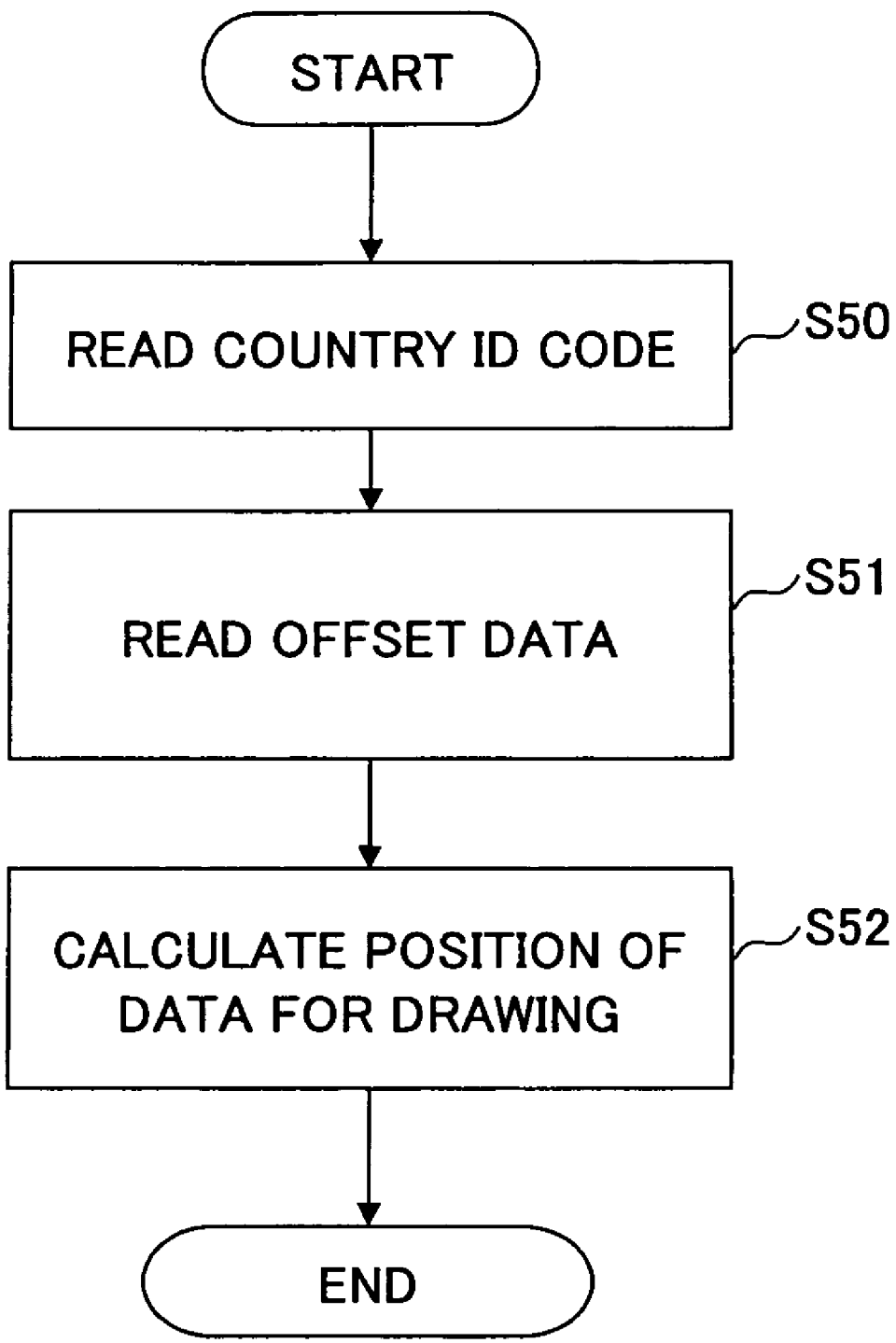
FIG. 21 shows a flow chart illustrating one example of a data address obtaining method concerning a multi-language message drawing function.

One example of processing for obtaining a data address according to the multi-language drawing function in the second embodiment of the present invention is described next with reference to FIG. 21. FIG. 21 shows a flow chart illustrating one example of processing for obtaining a data address according to the multi-language drawing function in the second embodiment of the present invention. Processing of Steps S50 through S52 described next is included in Step S41 shown in FIG. 8 described above for the first embodiment.

In Step S50, the multi-language data selection part 27 reads a country identification code which is a unique code previously assigned for each particular product shipping destination of the drawing apparatus, from a predetermined storage area. The predetermined storage area is, for example, the non-volatile RAM 16, the HDD 19, a carriable recording medium 14 such as an SD memory card, or, an HDD 1303, a ROM 1345, an SD card 1347, an ASIC 1301 or such shown in FIG. 25 and described later.

In Step S51, then, the multi-language data selection part 27 reads offset data from an offset table which provides a correspondence between each country identification code and relevant offset data for obtaining the data for drawing in the relevant language, based on the thus-read country identification code. The offset table is stored in, for example, the non-volatile RAM 16, the HDD 19, a carriable recording medium such as an SD memory card, or, an HDD 1303, a ROM 1345, an SD card 1347, an ASIC 1301 or such.

Then, in Step S52, the multi-language data selection part 27 calculates a location of the data for drawing in the relevant language corresponding to the relevant country identification code in a memory space of the program storage area based on the thus-obtained offset data.

Through the processing described above with reference to FIG. 21, it is possible to obtain the address in the memory space at which the data for drawing in the relevant language corresponding to the given country identification code is stored according to the multi-language drawing function. After that, by using the thus-obtained data for drawing, the drawing part 22 in the drawing program draws a relevant message or such in the relevant language on a display device of an operation part (1310 in FIG. 25) or such.

Figure 23:
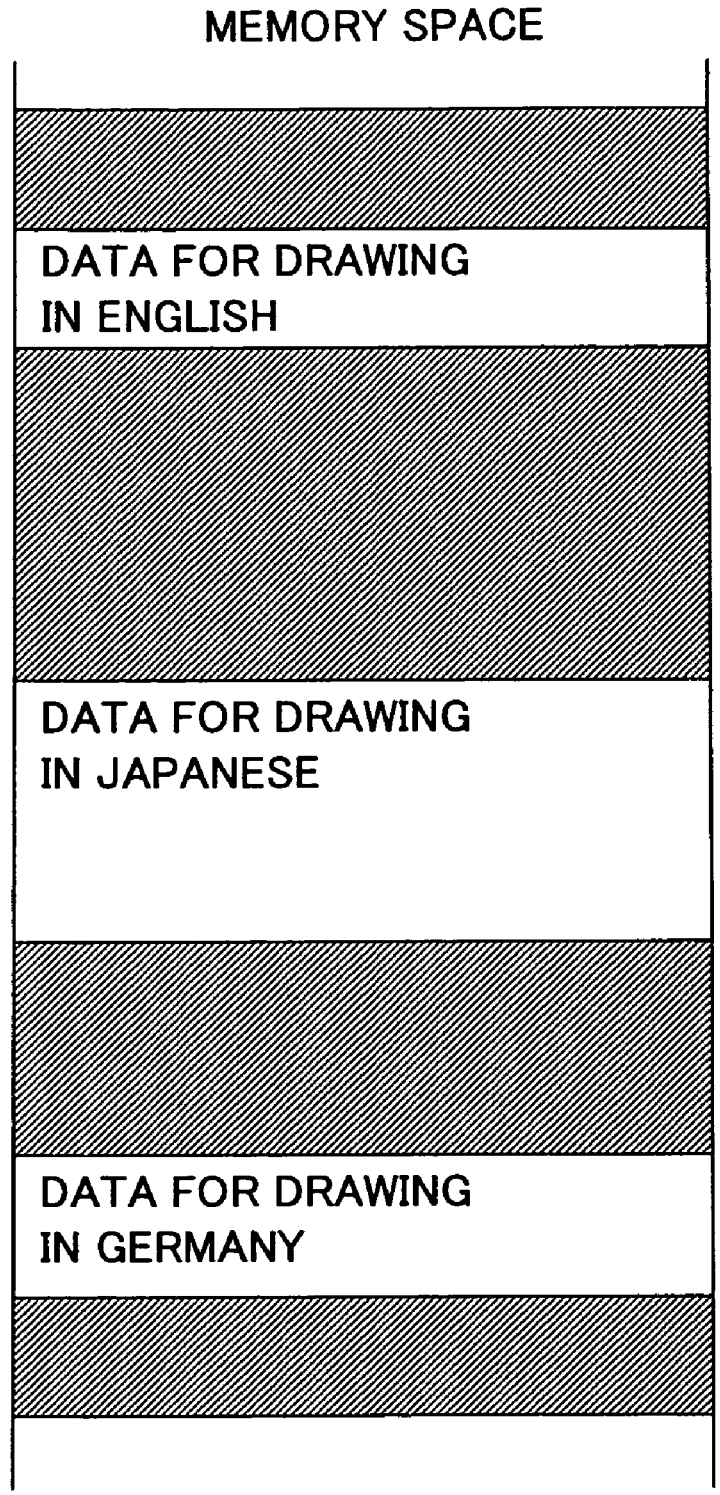

Examples of allocating the data for drawing concerning the multi-language drawing function in the memory space of the program storage area or such is shown in FIGS. 22 and 23.

In the example of FIG. 22, data sizes of the respective data for drawing in respective countries are equal thereamong, and also, are allocated in a predetermined fixed order.

In the example of FIG. 23, data sizes of the respective data for drawing in respective countries are not equal thereamong, and also, are allocated not in the predetermined fixed order.

In each of these examples of FIGS. 22 and 23, by configuring the above-mentioned offset table appropriately according to the actual particular allocation of the data for drawing, selection of the relevant data for drawing in a desired language can be properly achieved according to a given country identification code as mentioned above with the use of the relevant offset data.

Thus, according to the second embodiment of the present invention, by utilizing the program storage area or such, it is possible to store the data for drawing for a relevant message in a plurality of languages in the drawing apparatus, and then, by selecting relevant one of the data for drawing in the plurality of languages, it is possible to obtain the data for drawing in a relevant language, and to draw a message or such in the language.

A third embodiment of the present invention is described next.

Figure 24:
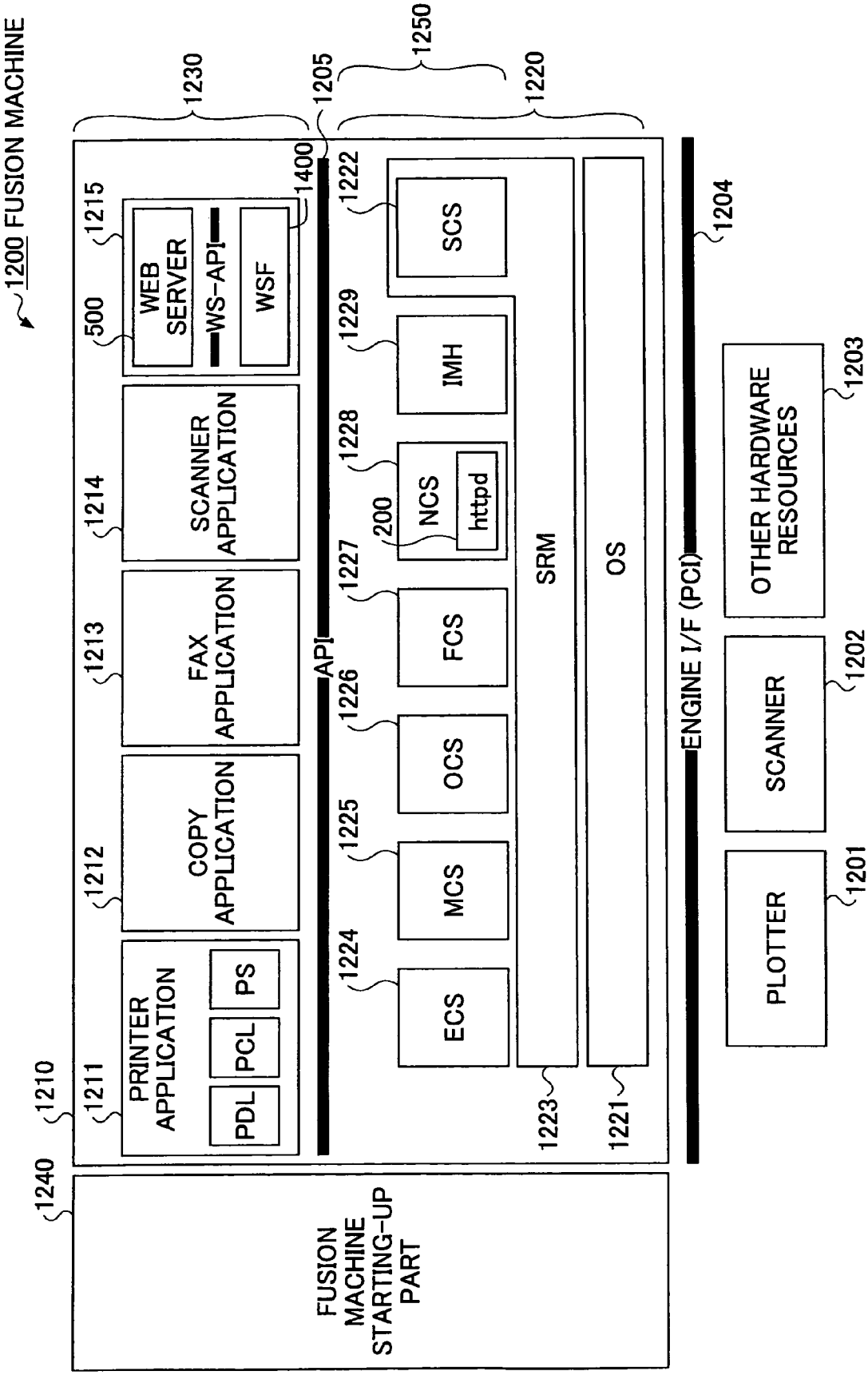
FIG. 24 shows a block diagram of a functional block diagram of a fusion machine according to the present invention.
Figure 25:
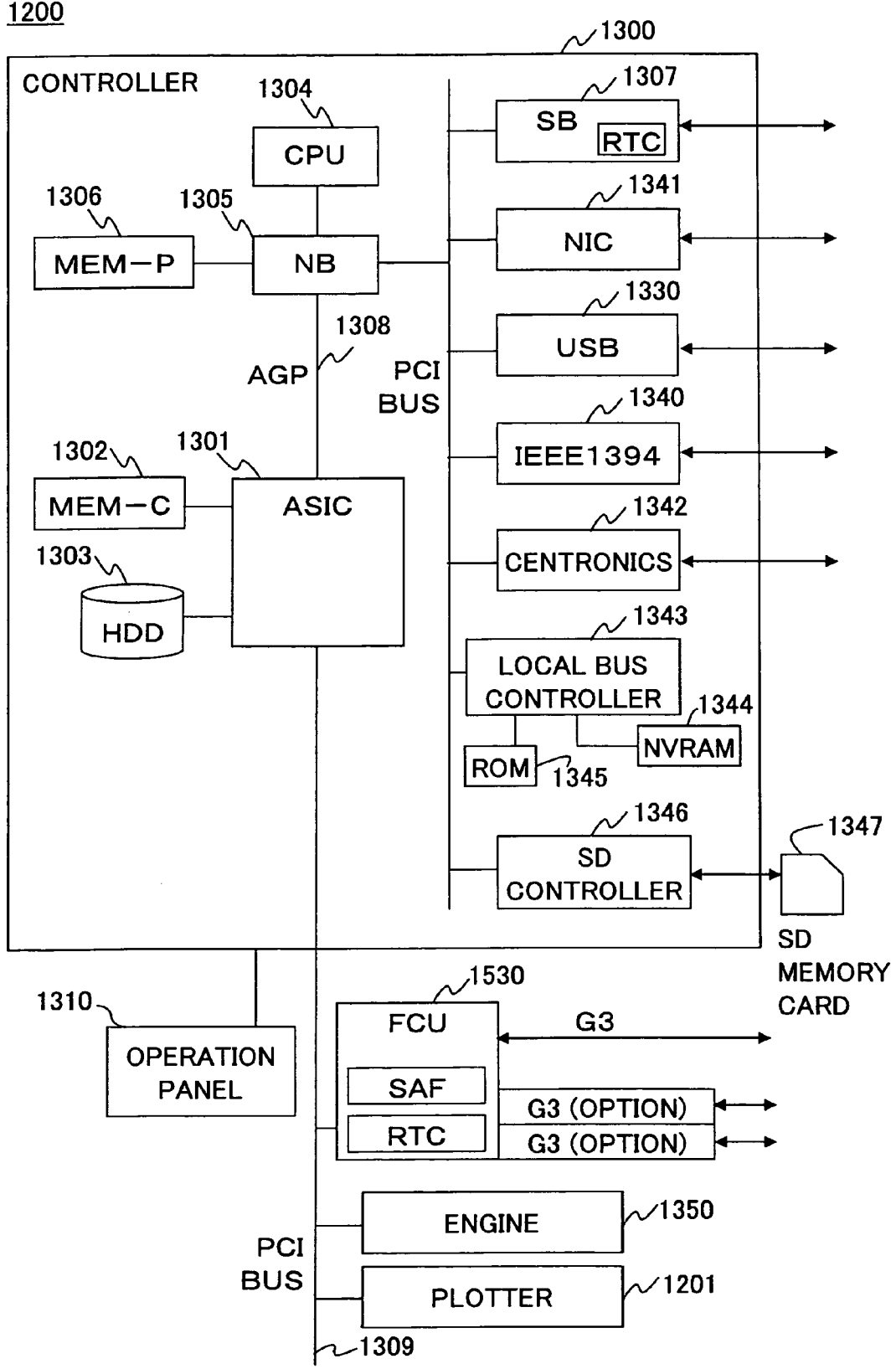
FIG. 25 shows a hardware configuration of the fusion machine.

With reference to FIGS. 24 and 25, an image forming apparatus (referred to as a 'fusion machine', hereinafter), as one example of a drawing apparatus according to the present invention is descried as the third embodiment of the present invention.

FIG. 24 shows a block diagram illustrating a functional configuration of the fusion machine. In this figure, the fusion machine 1200 includes hardware resources such as a plotter 1201, a scanner 1202 and a facsimile unit, and also, a software group including a platform 1220 and applications, as well as a fusion machine starting up part 1240.

The fusion machine starting up part (made of a software program or such) 1240 is executed first when a power supply in the fusion machine is turned on, and then it starts up the platform 1220 and the applications 1230. The drawing program or such included in the initialization program or such described above for the first embodiment is included in the fusion machine starting-up part 1240 or such, for example.

The platform 1220 includes a control service 1250 which interprets processing requests given by the applications 1230 and generates acquisition requests for the hardware resources, a system resource manager (SRM) 1223 which manages one or a plurality of the hardware resources and performs arbitration on the acquisition requests given by the control service 1250, and an OS 1221.

The control service 1250 includes a plurality of service modules, i.e., an SCS (system control service) 1222, an ECS (engine control service) 1224, an MCS (memory control service) 1225, an OCS (operation panel control service) 1226, an FCS (facsimile control service) 1227, an NCS (network control service) 1228 and an IMH (imaging memory handler) 1229.

The OS 1221 is an operating system of UNIX (registered trademark) or such, and executes respective software programs of the platform 1220 and the applications 1230 in parallel regarding as respective processes.

The SRM 1223 performs, in cooperation with the SCS 1222, system control and resource management.

The SCS 1222 executes a plurality of functions such as those for application management, operation part control, system page display (displaying a job list page, a counter indication page or such), LED indication, resource management, interruption application control and so forth.

The ECS 1224 controls an engine part including the plotter 1201, the scanner 1202 and the other hardware resources 1203, and thus, performs image reading and printing, status notification, jam recovery or such.

The MCS 1225 performs memory control, and, in particular, obtains or releases an image memory, uses a hard disk drive (HDD), compresses or decompresses image data and so forth.

The OCS 1226 is a module controlling an operation panel 1310 in FIG. 25 which acts as a measure for information transfer between an operator and apparatus body control, notifies the body control of the operator's key operation event, provides a library function for each application to establish a GUI, manages the thus-established GUI information for the respective applications, displays on the operation panel the processing result, and so forth.

The FCS 1227 performs facsimile transmission/reception with the use of a PSTN/ISDN network with respective application layers in the system controller, registration/citation of various sorts of facsimile data managed by an BKM (backup SRAM) and facsimile reading/printing operation, and provides an API (application program interface) for performing combined transmission/reception operation.

The NCS 1228 is a group of modules providing services used in common by the applications which need a network I/O, distributes data received from the network according to respective protocols to the respective applications, acts as an agency to transmit data to the network from the application, and so forth.

A configuration may be provided in the fusion machine 1200 in which, for example, the NCS 1228 performs control data communication with an external network apparatus connected via the Internet according to an HTTP (hypertext transfer protocol) by means of an httpd (hypertext transfer protocol daemon) 200 from among the plurality of protocols, starts up a processing part corresponding to a Web service designated by an HTTP request header by means of a function call, and notifies the processing result of the Web service to the network apparatus by means of an HTTP response. The Web service may be provided in response to a message described in an XML (extended markup language), for example.

The IMH 1229 performs mapping of image data from a virtual memory area (user virtual space) to a physical memory, and, also, performs processing of system call in response to starting up of the process, mapping of a virtual memory area for the process, releasing the mapped virtual memory area after the finish of the process and so forth.

The applications 1230 include a printer application 1211 which is an application for a printer function having a page description language (PDL), a PCL and a postscript (PS); a copy application 1212 which is an application for a copying function; a fax application 1213 for a facsimile function; a scanner application 1214 for a scanning function; and a Web service processing application 1215.

The Web service processing application 1215 includes a Web server 500 which receives an HTTP request requesting a Web service and transmits an HTTP response so as to provide the Web service; and a Web service function (WSF) 1400 which performs predetermined processing with the use of the control service 1250 via the API (application program interface), and provides the processing result as the Web service via an WS-API (Web service application program interface).

FIG. 25 shows a hardware block configuration of the fusion machine 1200.

As shown in FIG. 25, in the fusion machine 1200, the operation panel (operation part) 1310, a facsimile control unit (FCU) 1530, the engine part 1350 (to which the scanner or such is connected), the plotter 1201 and the ASIC 1301 in a controller 1300 are connected by means of a PCI (peripheral component interconnect) bus 1308 or such.

In the controller 1300, an MEM-C1302, a HDD (hard disk drive) 1303 and so forth are connected to the ASIC 1301, and also, the ASIC 1301 and a CPU 1304 are connected by means of an NB 1305 of a CPU chip set The CPU 1304 performs total control of the fusion machine 1200, and, specifically, starts up and executes the SCSI 1222, the SRM 1223, the ECS 1224, the MCS 1225, the OCS 1226, the FCS 1227 and the NCS 1228 in the platform 1220 on the OS 1221, and also, starts up and executes the printer application 1211, the copy application 1212, the fax application 1213, the scanner application 1214 and the Web service processing application 1215 in the applications 1230.

The NB 1305 is a bridge which connects the CPU 1304 with an MEM-P 1306, an SB 1307, an NIC (network interface card) 1341, a USB (universal serial bus) 1330, an IEEE1394 1340, a centronics 1342, an SD controller 1346 and the ASIC 1301.

The MEM-P 1306 is a system memory used as a drawing memory in the fusion machine 1200. The SB 1307 is a bridge connecting the NB 1305 with a ROMPCI device and a peripheral device. The MEM-C 1302 is a-local memory used as an image buffer for copying operation, as a code buffer or such. The ASIC 1301 is an IC for image processing having a hardware element used for the image processing.

The local bus controller 1343 controls a local bus, and is connected to an NVRAM 1344, a ROM 1345 and so forth.

The SD controller 1346 acts as an I/F used for reading a program, an application or such from an SD card 1347 inserted thereto, and mounting it in the fusion machine 1200.

The HDD 1303 acts as storage for image data, a program, font data, various forms and documents. The operation panel 1310 acts as an operation part receiving operation instructions input from and providing display/indication to an operator.

In the ASIC 1301, a ROM interface for connecting with the MEM-C1302 and a hard disk interface for connecting with the HDD 1303 are provided, and, when image data is input in or output from such a storage part, an actual target for the input/output operation is switched to the RAM interface or the hard disk interface.

An AGP 1308 is a bus interface for a graphic accelerator card proposed for increasing a graphic processing speed, and increases a processing speed for a graphic accelerator card by performing direct access to the system memory.

The data for drawing mentioned above for the first embodiment may be mounted in the fusion machine 1200 and actually, it is stored in the MEM-P 1306, or is stored in the HDD 1303.

In the above-described first through third embodiments, the drawing program according to the present invention is included in the initialization program or such. However, the drawing program according to the present invention may be included in any other program which operates even when the file system cannot be used. For example, the drawing program may be included in a program which has a function of displaying an error message when the OS has a serious trouble and thus the file system cannot be used. Further, it is also possible to include the drawing program in a program which draws a logo or such other then an error message during a time in which the OS is being started up in the machine.

Embodiments of the present invention are not limited to those specific embodiments described above, variation and modification can be made as long as it lies within the scope of the present invention recited in the claims below. For example, other than the above-mentioned PC1 or the fusion machine 1200, a drawing apparatus according to the present invention can be applied in a form of various devices/machines/equipment/apparatuses, such as a copy machine, a facsimile machine, a PDA (personal digital assistant), a cellular phone, a game machine, an automobile, a car navigation equipment, an automatic dispenser, a TV apparatus, and so forth.

The present application is based on Japanese Priority Application No. 2003-159612, filed on Jun. 4, 2003, the entire contents of which are hereby incorporated by reference.

What is claimed is:

1. A drawing apparatus comprising a management part for managing data recorded in a recording part, comprising:
    a first obtaining part configured to obtain data for drawing, which is used in common by a plurality of programs, without using the management part, when the management part cannot be initialized or is malfunctioning;
    a drawing part configured to draw based on the data for drawing obtained by the first obtaining part, said data for drawing including character data in respective versions of a plurality of different languages;
    a search part configured to search for the data for drawing recorded in said recording part;
    a storage part configured to store a plurality of country identification codes;
    a second obtaining part configured to obtain default data for drawing previously prepared in response to a search result provided by said search part; and
    a selection part configured to read a country identification code from the storage part, and to select from among the respective versions of the character data based on the read country identification code.

2. The drawing apparatus as claimed in claim 1, wherein: said first obtaining part obtains the data for drawing based on predetermined address information.

3. The drawing apparatus as claimed in claim 1, wherein: said drawing part performs drawing based on the data for drawing obtained by said first obtaining part.

4. The drawing apparatus as claimed in claim 1, wherein: said search part performs searching for the data for drawing based on a predetermined character string.

5. The drawing apparatus as claimed in claim 1, wherein: said search part performs searching for the data for drawing based on a predetermined bit string.

6. The drawing apparatus as claimed in claim 1, wherein said storage part stores the data for drawing searched for and thus obtained by means of said search part.

7. The drawing apparatus as claimed in claim 6, wherein: said first obtaining part obtains the data for drawing from said storage part.

8. A computer readable information recording medium including a drawing program stored thereon, and comprising instructions for causing a computer to execute the steps of:
    a) obtaining data for drawing, which is used in common by a plurality of programs, without using a management part, which manages data recorded in a recording part, when the management part cannot be initialized or is malfunctioning;
    b) performing drawing based on the data for drawing, said data for drawing including character data in respective versions of a plurality of different languages;
    c) searching for the data for drawing recorded in said recording part;
    d) obtaining default data for drawing previously prepared in response to a search result provided by said search part;
    e) storing a plurality of country identification codes;
    f) reading a country identification code; and
    g) selecting from among the respective versions of the character data based on the read country identification code.

9. The computer readable information recording medium as claimed in claim 8, wherein: in said step a), the data for drawing is obtained based on predetermined address information.

10. The computer readable information recording medium as claimed in claim 8, wherein: in said step b), drawing is performed based on the data for drawing obtained in said step a).

11. The computer readable information recording medium as claimed in claim 8, wherein; in said step c), searching for the data for drawing is performed based on a predetermined character string.

12. The computer readable information recording medium as claimed in claim 8, wherein: in said step c), searching for the data for drawing is performed based on a predetermined bit string.

13. The computer readable information recording medium as claimed in claim 8, further comprising instructions for causing the computer to execute the step of:
    h) storing the data for drawing searched for and thus obtained in said step c).

14. The computer readable information recording medium as claimed in claim 13, wherein: in said step a), the data for drawing, which is once stored in said step h), is obtained.

15. A drawing method implemented by a computer having a processor and memory comprising the steps of:
    a) obtaining data for drawing, which is used in common by a plurality of programs executed by the computer, without using a management part of the computer, which manages data recorded in a recording part of the computer, when the management part cannot be initialized or is malfunctioning;

b) performing with the computer drawing based on the data for drawing, said data for drawing including character data in respective versions of a plurality of different languages;
c) searching for the data for drawing recorded in said recording part;
d) obtaining default data for drawing previously prepared in response to a search result provided by said search part;
e) storing with the computer a plurality of country identification codes;
f) reading with the computer a country identification code; and
g) selecting with the computer from among the respective versions of the character data based on the read country identification code.

* * * * *